(12) United States Patent
Nakamura et al.

(10) Patent No.: US 7,904,746 B2
(45) Date of Patent: Mar. 8, 2011

(54) INFORMATION PROCESSING SYSTEM AND DATA RECOVERY METHOD

(75) Inventors: Shuji Nakamura, Machida (JP); Akira Fujibayashi, Sagamihara (JP); Hajime Mori, Yokohama (JP); Masanori Takada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 278 days.

(21) Appl. No.: 12/206,228

(22) Filed: Sep. 8, 2008

(65) Prior Publication Data
US 2010/0011238 A1     Jan. 14, 2010

(30) Foreign Application Priority Data
Jul. 11, 2008    (JP) ................................. 2008-180878

(51) Int. Cl.
*G06F 11/00*    (2006.01)
(52) U.S. Cl. ..................................... 714/5; 714/3; 714/6
(58) Field of Classification Search ................ 714/6, 5, 714/3
See application file for complete search history.

(56) References Cited

U.S. PATENT DOCUMENTS

| | | | |
|---|---|---|---|
| 5,978,565 A * | 11/1999 | Ohran et al. ..................... 714/13 |
| 6,195,695 B1 * | 2/2001 | Cheston et al. ............... 709/221 |
| 6,508,865 B2 * | 1/2003 | Colson ............................ 95/273 |
| 6,880,101 B2 * | 4/2005 | Golasky et al. ................... 714/4 |
| 7,555,674 B1 * | 6/2009 | Wang ................................ 714/15 |
| 2006/0085609 A1 * | 4/2006 | Ninose et al. ................. 711/162 |
| 2008/0263393 A1 * | 10/2008 | Shirogane et al. ................ 714/7 |

FOREIGN PATENT DOCUMENTS
JP     2000-122872 A    4/2000

* cited by examiner

*Primary Examiner* — Philip Guyton
(74) *Attorney, Agent, or Firm* — Sughrue Mion, PLLC

(57) ABSTRACT

When data of HDD of computer is backed up to a a data center and a failure occurs in the HDD, the computer notifies failure information to the data center, and the data center stores the backed up data in a storage medium substituting HDD for subsequent delivery. Further, the computer executes processing, using a VNC server, from failure occurrence until recovery.

11 Claims, 29 Drawing Sheets

FIG. 13

| CONFIGURATION ITEMS | | |
|---|---|---|
| INITIAL CONFIGURATION | CPU CLOCK | 1G |
| | CPU VOLTAGE | 5V |
| | ... | ... |
| | BOOT DRIVE | C |
| | ... | ... |
| AUTHENTICATION | ID | 123456 |
| | PS | 342658 |
| | SPECIFICATIONS (MODEL NUMBER) | DCD-0124A |
| | USER ADDRESS | 1234.chiyoda-ku,Tokyo,Japan |
| BACKUP CONFIGURATION | CONFIGURATION | 1 |
| | BACKUP TARGET | INTERNAL HDD |
| | STATUS | NORMAL |
| | BACKUP TARGET MODEL NUMBER | 0123HDD |
| | BACKUP METHOD | DIFFERENTIAL BACKUP |
| | BACKUP TIMING | 1h |
| | BACKUP TARGET | |
| | STATUS | |
| | BACKUP TARGET MODEL NUMBER | |
| | BACKUP METHOD | |
| | BACKUP TIMING | |
| OPERATING MODE | | VNC MODE |
| SERVER | BACKUP SERVER | www.BKSI.com |
| | VNC SERVER | www.VNCSI.com |
| | DELIVERY SERVER | www.DSI.com |
| | | |
| | | |

FIG. 23

| DATA CENTER | TYPE | LOCATION | IP ADDRESS | CANDIDATE 1 | CANDIDATE 2 | CANDIDATE 3 |
|---|---|---|---|---|---|---|
| DATA CENTER A | BACKUP | Chiyoda-ku, Tokyo,Japan | www.BKS1.com | - | - | |
| | VNC | Chiyoda-ku, Tokyo,Japan | www.VNCS1.com | - | - | |
| | DELIVERY | Chiyoda-ku, Tokyo,Japan | www.DS1.com | <100km | >1000km | |
| DATA CENTER B | BACKUP | Palo Alto, CA | www.BKS2.com | - | - | |
| | VNC | Palo Alto, CA | www.VNCS2.com | >1000km | <100km | |
| | DELIVERY | Palo Alto, CA | ... | ... | ... | |
| DATA CENTER C | BACKUP | ... | ... | ... | ... | |

FIG. 24

| Vol-ID | Serial No | ADDRESS | CAPACITY | PURPOSE |
|---|---|---|---|---|
| 0 | 00-04 | 0000-0100 | 40G | BACKUP CONTROL PROGRAM |
| 1 | 00-04 | 0100-0200 | 40G | USER DATA |
| 2 | 00-04 | 0200-0300 | 40G | VNC CONTROL PROGRAM |
| 3 | 00-04 | 0400-0500 | 40G | VM CONTROL PROGRAM |
| 4 | 05-09 | 0000-0050 | 2G | CONTROL INFORMATION |
| 5 | 05-09 | 0050-0100 | 2G | USER INFORMATION |
| 6 | 05-09 | 0100-0125 | 1G | |
| 7 | 05-09 | 0125-0225 | 40G | DELIVERY CONTROL PROGRAM |
| 8 | 10-14 | 000-0250 | 100G | USER DATA |
| 9 | 10-14 | 0250-0500 | 100G | JNL |
| 10 | 10-14 | 0500-0600 | 40G | Base |
| 11 | 10-14 | 0600-0700 | 40G | |
| 12 | 10-14 | 0700-0800 | 40G | |
| ... | ... | ... | ... | ... |

FIG. 28

| USER ID | PW | ADDRESS | DATA Vol | TYPE OF STORAGE | CHECKPOINT | RVol | DVol | BVol | JVol | GVol |
|---|---|---|---|---|---|---|---|---|---|---|
| 010101 | aaaaa | ... | Vol-14 | 1 | 11:00 | Vol-15 | | | | |
| 010012 | bbbbb | ... | Vol-18 | 3 | | Vol-22 | | Vol-21 | Vol-20 | |
| ... | ... | ... | ... | ... | ... | ... | ... | ... | ... | ... |

STORAGE TYPE: "1" GENERATIONAL STORAGE METHOD; "2" SNAPSHOT STORAGE METHOD;
"3" ARBITRARY TIME RECOVERY STORAGE METHOD

FIG. 31

| USER | BOOT PROGRAM | CPU LOAD |
|---|---|---|
| A | OS<br>APP1 | 60% |
| B | OS<br>APP2<br>APP3 | |

FIG. 32

| DELIVERY CANDIDATE | NEAREST DATA CENTER | DELIVERY TIME |
|---|---|---|
| ××Chiyoda-ku,Tokyo,Japan | Yokohama | 90min |
| 1234yy st,San Francisco,CA | San Jose | 60min |

FIG. 34

| REPLACEMENT HDD | PRE-REPLACEMENT HDD | | | | | | | | | |
|---|---|---|---|---|---|---|---|---|---|---|
| | ① | ② | ③ | ④ | ⑤ | ⑥ | ⑦ | ⑧ | ⑨ | ⑩ |
| ①2.5HDD(120GB) | ○ | | | | ○ | ○ | | | | |
| ②2.5HDD(160GB) | ○ | ○ | | | ○ | ○ | | | | |
| ③3.5HDD(500GB) | | | ○ | | | | ○ | ○ | | |
| ④3.5HDD(1TB) | | | ○ | ○ | | | ○ | ○ | | |
| ⑤2.5SSD(16GB) | | | | | ○ | | | | | |
| ⑥2.5SSD(32GB) | | | | | ○ | ○ | | | | |
| ⑦SSD(32GB) | | | | | | | ○ | | | |
| ⑧SSD(64GB) | | | | | | | ○ | ○ | | |
| ⑨iVDR | | | | | | | | | ○ | |
| ⑩RAID(HDD×4) | | | | | | | | | | ○ |

INFORMATION PROCESSING SYSTEM AND DATA RECOVERY METHOD

CROSS-REFERENCE TO PRIOR APPLICATION

This application relates to and claims the benefit of priority from Japanese Patent Application number 2008-180878, filed on Jul. 11, 2008, the entire disclosure of which is incorporated herein by reference.

BACKGROUND

The present invention generally relates to an information processing system that can resume operation even when a failure occurs in a computer storage device.

Japanese Patent Laid-open No. 2000-122872 discloses that a lidded spare casing, which houses a main hard disk incorporating an OS, disk drive and application software, is provided to a user in advance, and the user replaces the casing of a main hard disk, which has either become unstable or been broken during use, by turning OFF the power and inserting the above-mentioned spare casing into the personal computer main unit. Further, this Japanese Patent Laid-open No. 2000-122872 discloses that the user then sends the either unstable or broken main hard disk back to the manufacturer, and the manufacturer initializes the user-returned main hard disk, reproduces the OS and application software, incorporates a compatible device driver into the user's hardware environment once again, and after completing operational testing, returns the repaired main hard disk to the user, and the user keeps this repaired main hard disk as a spare casing that houses a normal main hard disk.

The technology disclosed in Japanese Patent Laid-open No. 2000-122872 is limited in that it is possible to continue to use the computer, but it is not possible to store user data in the main hard disk incorporating the OS, device driver and application software, making it necessary to store user data and configuration information in a different storage medium. Further, there is no disclosure regarding job continuation when the storage medium on which the user data and configuration information is stored fails.

SUMMARY

An object of the present invention is to provide a system that enables a user to easily resume a job when a failure occurs in the computer storage device (medium).

An information processing system has a computer, which comprises a first storage device; and a server, which comprises a second storage device. The computer executes an operating system and application program stored in the first storage device, and stores user data either generated or created by the application program in the first storage device. Further, the computer transfers the data stored in the first storage device to the server, and stores this data in the second storage device. Upon detecting the failure of the first storage device, the computer informs the server that a failure has occurred. The server, based on the specifications of the computer, determines a storage medium capable of being used by the computer, and creates a replication of the data stored in the second storage device in the determined storage medium.

BRIEF DESCRIPTION OF THE DRAWINGS

FIG. 13 shows an example of configuration information;
FIG. 23 shows an example of server information;
FIG. 24 shows an example of logical volume information;
FIG. 28 shows an example of user information;
FIG. 31 shows an example a server status management table;
FIG. 32 shows an example of delivery information;
FIG. 34 shows an example of compatible storage medium information.

DESCRIPTION OF THE PREFERRED EMBODIMENTS

An example of the embodiment of the present invention will be explained hereinbelow. Furthermore, the present invention is not limited solely to the embodiment disclosed hereinbelow.

Figure 1:
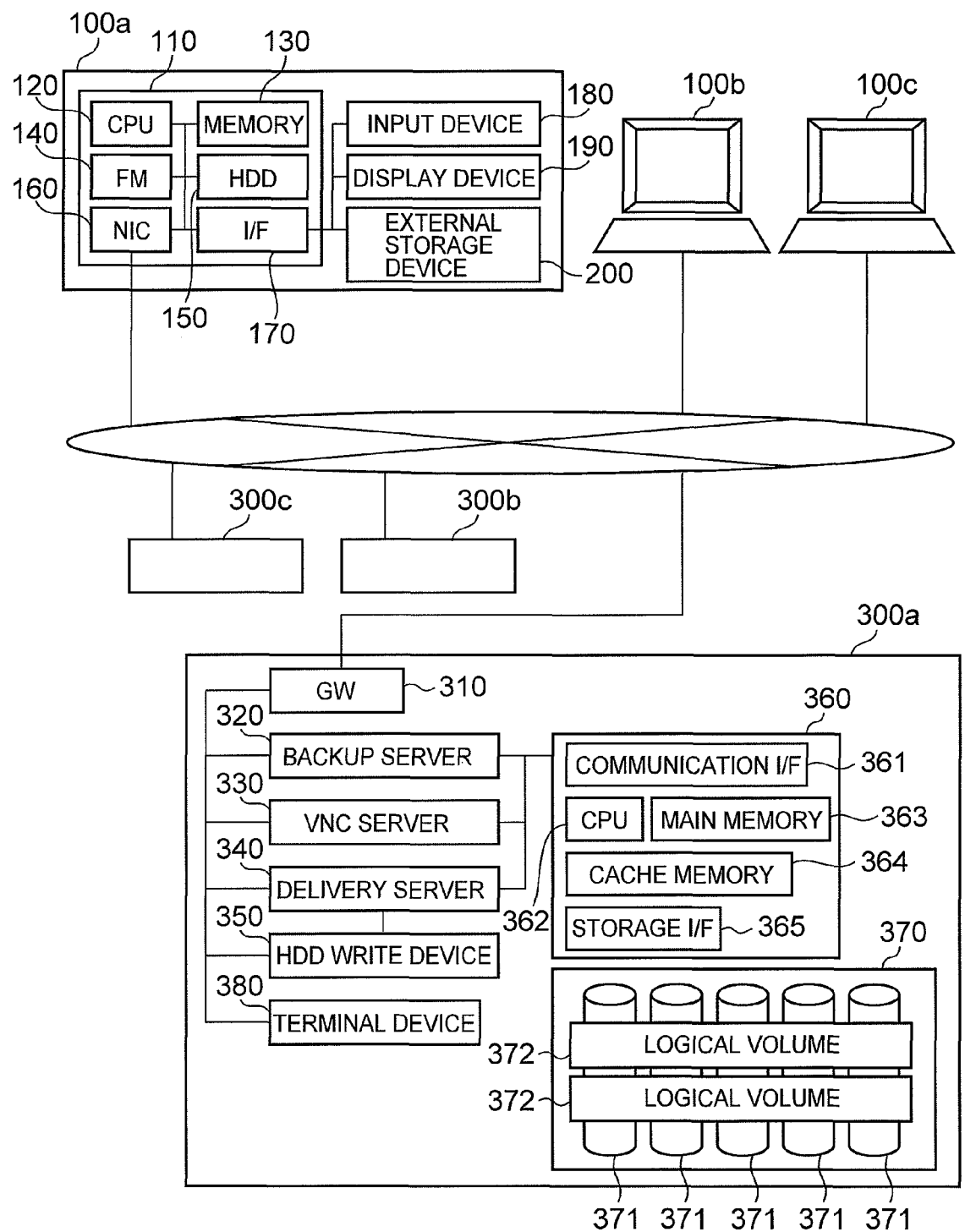
FIG. 1 shows an example of an information processing system.

FIG. 1 shows an example of the configuration of an information processing system. The information processing system is connected by way of a network to a plurality of computers 100a, 100b, 100c, and a plurality of data centers 300a, 300b, 300c.

The respective computers 100a, 100b, 100c are used by users to execute jobs, and feature the same basic hardware configuration. The computers 100a, 100b, 100c will be referred to collectively here as computer 100. The data centers will similarly be referred to collectively as data center 300.

The computer 100 comprises a controller 110 that executes an operating system and application program; an input device 180 such as a keyboard or mouse; a display device 190; and an external storage device 200. The external storage device 200 is a storage device, such as a flash memory or other such nonvolatile semiconductor, a magnetic disk or an optical disk. The controller 110 has a CPU 120; a memory 130; a flash memory (FM) 140; a hard disk drive (HDD) 150; a NIC 160, which is the communication interface with a network; and an interface (IF) 170 for connecting to the input device 180, the display device 190, and the external storage device 200, and these components are connected via an internal bus (a signal line and data line).

Furthermore, the example shown here is of a desktop-type computer in which the controller 110, input device 180 and display device 190 are separate units, but the computer can also be a notebook-type computer into which the controller 110, input device 180 and display device 190 have been integrated. Further, it is supposed that the configuration uses an HDD 150 as the internal storage device of the controller 110, but this internal storage device can also be a nonvolatile semiconductor storage device such as a flash memory, or another disk storage device such as an optical disk.

Figure 2:
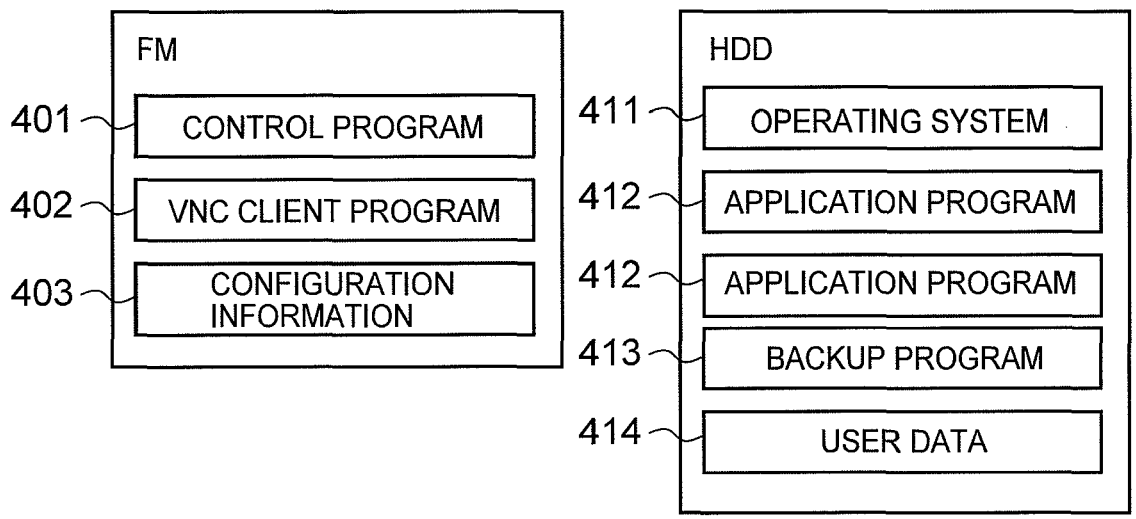
FIG. 2 shows an example of programs and data stored in a computer storage device.

FIG. 2 shows the programs and data stored in the FM 140 and HDD 150 of the computer 100. The FM 140 stores a control program 401; a VNC client program 402; and configuration information 403. Furthermore, the configuration can also be such that the control program 401, VNC client program 402, and configuration information 403 are stored in the external storage device 200 instead of the FM 140. Further, the HDD 150 stores an operating system 411; a plurality of application programs 412; a backup program 413; and data (user data) 414. As used here, user data 414 comprises files, which are data created by an application program 412, or data used by an application program 412.

Returning to FIG. 1, the data center 300 has a gateway (GW) 310 that mainly carries out protocol conversion processing; a backup server 320; a VNC (Virtual Network Computing) server 330; a delivery server 340; an HDD write device 350; a storage controller 360; a storage device 370; and a terminal device 380. The GW 310, backup server 320, VNC server 330, delivery server 340 and terminal device 380, for example, are interconnected via a TCP/IP protocol network. Further, the backup server 320, VNC server 330 and delivery server 340, for example, are interconnected via a fibre channel protocol network.

The basic hardware configurations of the backup server 320, VNC server 330 and delivery server 340 are all the same, and have a processor (CPU) for executing a process, and a memory. Of course, the present invention is not limited to one processor and one memory, but rather can comprise a plurality of processors and memories. The backup server 320, VNC server 330 and delivery server 340 are used in accordance with the different programs to be executed.

The backup server 320 stores data sent from the computer 100 in a specified storage area inside the storage device 370.

The VNC server 330 boots the operating system and an application program in accordance with an operation from the computer 100. Further, the VNC server 330 divides a screen into small areas, specifies a location and sends pixel data to the computer 100. Consequently, the VNC server 330 provides the user with the same environment as that of the computer 100. Furthermore, when the bandwidth of the network is wide, the VNC server 330 can send all of the divided pixel data to the computer 100, but when the bandwidth is narrow, the VNC server 330 can either send compressed pixel data or can send only the part of the screen that has changed.

The delivery server 340, in accordance with an indication from the computer 100, determines the storage medium (for example, HDD, FM and so forth) capable of being used with the computer 100, and stores the various types of programs and user data stored in the storage device 370 in the determined storage medium. This storage medium is sent to the requesting computer.

The storage device 370 has a plurality of hard disk drives (HDD) 371. Furthermore, flash memories or other such nonvolatile semiconductor storage devices, or optical disk storage devices can be used instead of the HDD 371.

The storage controller 360 has a communication interface (communication I/F) 361 for sending and receiving commands and data to and from the backup server 320, VNC server 330 and delivery server 340; a storage interface (storage I/F) 365 for exchanging data with the storage device 370; a main memory 363 that stores programs for executing various types of processing; a CPU 362, which executes a program stored in the main memory, and which controls the writing and reading of data to and from the storage device 370; and a cache memory 364 that temporarily stores data. Furthermore, there can be a plurality of CPU 362.

The storage controller 360 receives a data write or read request from the backup server 320, VNC server 330 or delivery server 340, and controls the writing of data to the storage device 370 or the reading of data from the storage device 370. More specifically, the processor 362 of the storage controller 360, upon receiving a write request, stores the data received from the communication I/F 361 in the cache memory 364, and thereafter, stores the data, which has been stored in the cache memory 364, in the storage device 370. Further, upon receiving a read request, the processor 362 determines if the requested data is in cache memory 364, and if the data is in the cache memory 364, sends the data to the requesting computer 100 via the communication I/F 361. Conversely, when the requested data is not in the cache memory 364, then processor 362 reads the requested data from the storage device 370 and stores this data in the cache memory 364, and thereafter, sends this data to the requesting computer 100 via the communication I/F 361. Furthermore, when a nonvolatile semiconductor memory, for example, a flash memory is used instead of the HDD 371, the configuration can be such that one part of the area of this flash memory is used as the cache memory.

The storage controller 360 can manage the storage area provided by the storage device 370 HDD as a logical storage area (a logical volume). This logical storage area is provided to the backup server 320, VNC server 330 and delivery server 340. That is, respective identifiers (Vol-ID) are assigned to the logical volumes created by the storage controller 360. Then, the backup server 320, VNC server 330 and delivery server 340 send a data write request or a data read request together with this identifier to the storage controller 360. The storage controller 360 carries out a data write or a data read to the storage area managed using this identifier. Further, the storage controller 360 can also manage the storage area as a RAID configuration. More specifically, the storage controller 360 creates one logical storage area (logical volume) 372 from a portion of the storage area of each HDD 371. For example, when RAID5 is configured from four data areas and one parity data area, one logical volume 372 is created from five HDD 371. The CPU 362 divides the write data into four parts, and also creates a parity data for recovering the data. Then, the CPU 362 stores the four parts of the divided data and the parity data in five HDD 371. By storing the write data in this way, even if one HDD fails, the CPU 362 can recover the original data using the data and parity data stored in the remaining four HDD 371. Consequently, reliability can be enhanced. RAID5 was explained here, but another RAID configuration can also be used.

Further, as mentioned hereinabove, the main memory 363 of the storage controller 360 stores programs that carry out the storing of data differently than simply writing data to a target storage area or reading data from a target storage area. Three data storage methods that maintain data of a prescribed point in time will be explained here.

Figure 3:
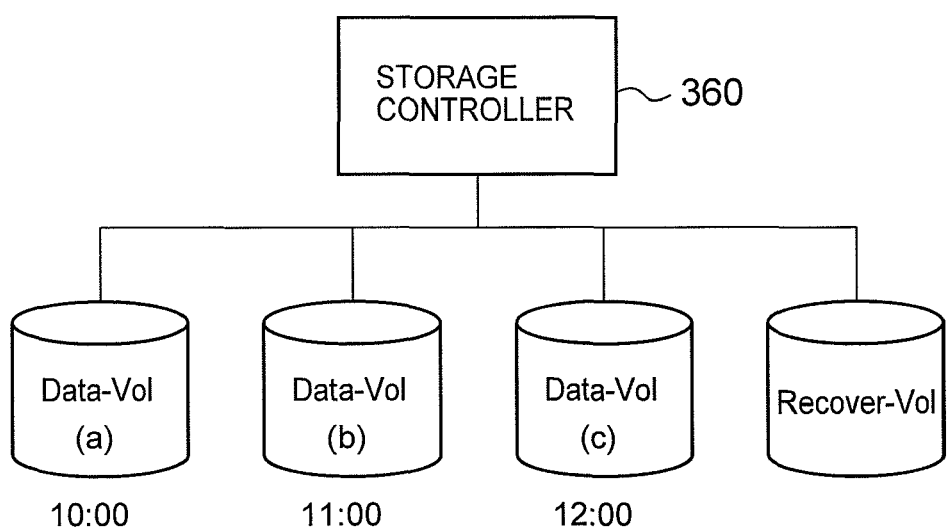
FIG. 3 shows an example of a data storage method.

FIG. 3 shows the simplest data storage method. This is a method in which a plurality of storage areas for storing data is configured, and data is stored sequentially. For the following explanation, this storage method will be called the "generational storage method" here. More specifically, three logical volumes (Data-Vol) are configured for storing data. First, the storage controller 360 sequentially stores the write-requested data in Data-Vol (a) initially. Then, when the state of the logical volume is to be maintained at the current point in time (for example, at 10:00), the storage controller 360 copies the data stored in Data-Vol (a) to Data-Vol (b), and thereafter stores write-requested data in Data-Vol (b). Consequently, since a new data write does not occur in Data-Vol (a), the state at the time 10:00 can be maintained. Similarly, the state of Data-Vol (b) can also be maintained at a certain point in time. Furthermore, when time has elapsed, and the state of Data-Vol (c) is to be maintained at the current point in time, the storage controller 360 copies the data of Data-Vol (c) to Data-Vol (a), and maintains the state of Data-Vol (c) by writing data to Data-Vol (a) thereafter. Thus, it is possible to maintain the state of a certain point in time by sequentially switching among the three Data-Vol to store data. Furthermore, the configuration here is such that the states at two points in time (two generations) are maintained by using three Data-Vol, but it is also possible to maintain the states of a plurality of generations by increasing the number of Data-Vol. Furthermore, since the Data-Vol are switched sequentially, there is a limit on the time periods capable of being maintained. In this case, data to be maintained for a long period of time is stored in a Recover-Vol.

Figure 4:
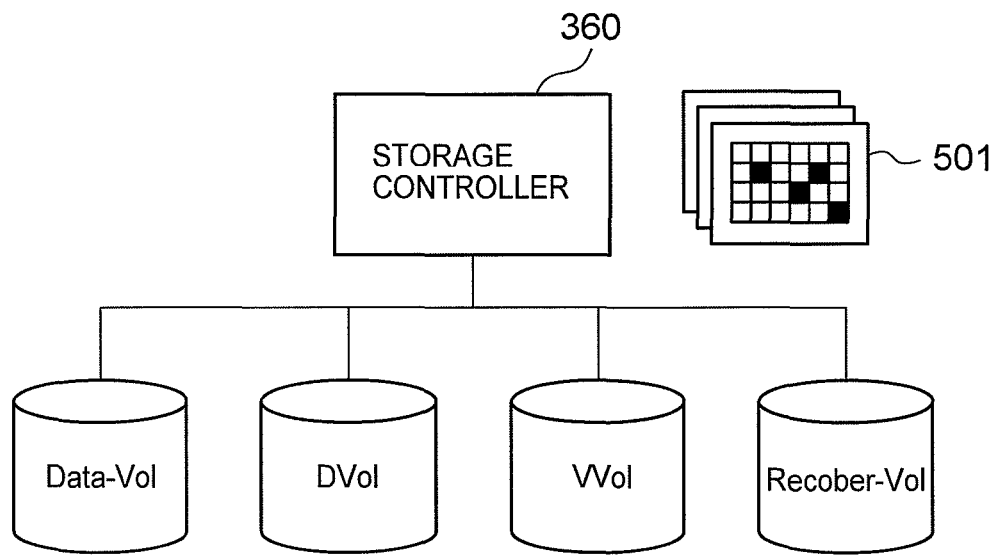
FIG. 4 shows an example of another data storage method.

FIG. 4 shows another data storage method. This is a data storage method that makes it possible to recover data at a certain specified point in time. For the following explanation, this storage method will be called the "snapshot storage method" here. This method configures a logical volume (D-Vol) for storing difference data, and a logical volume (Data-Vol) for storing write-targeted data. Further, the storage controller 360 comprises a bitmap 501 that manages the data volume update status.

Figures 5A, 5B, 5C:
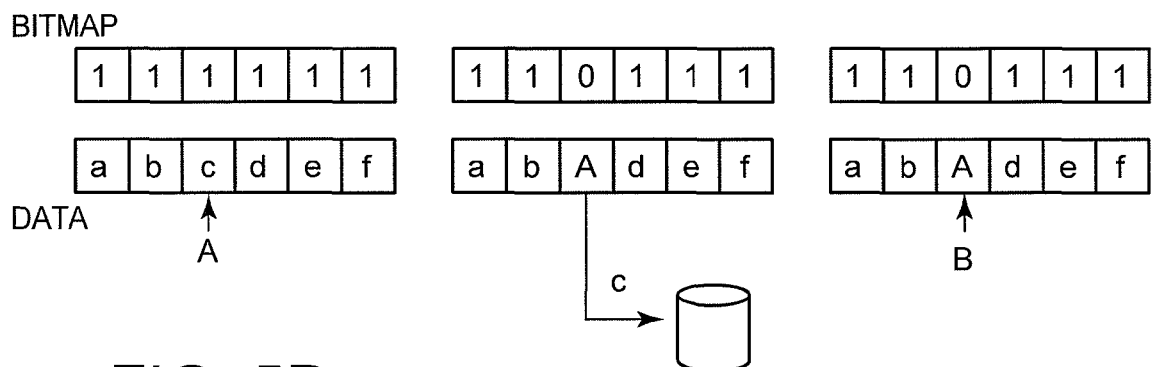
FIG. 5 shows an overview of a data storage method.
Figure 5D:
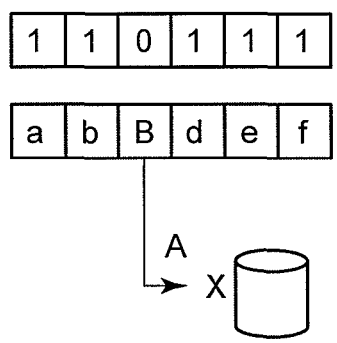

FIG. 5 shows an overview of this snapshot storage method. The storage controller 360 stores write-targeted data sequentially in the Data-Vol. The data "abcdef" is stored in the Data-Vol at the current point in time, and when this state is to be subsequently recovered, the bitmap of the storage controller 360 is configured to all "1s" (FIG. 5(a)). When data "A" is to be stored via a new write request, data (c), which is already being stored, is stored in the D-Vol, and thereafter, data "A" is stored in the Data-Vol (FIG. 5(b)). Furthermore, a write to the D-Vol is not carried out to an area in which a bit has been updated one time even if a new write request is generated. That is, when there is a write request for data "B" (FIG. 5(c)), data "B" is written to the Data-Vol, but data "A" is not stored in the D-Vol (FIG. 5(d)). Thus, when there is a new write request for a part of the Data-Vol which is corresponded to a "1" in the bitmap, the already stored data is stored in the D-Vol. Then, when the data is to be recovered, the storage controller 360 reads out the data from the D-Vol, and stores the read-out data in an area which has been updated from "1" to "0". For example, in the state of FIG. 5(d), data (c), which is stored in the D-Vol, can be recovered to the state of FIG. 5(a) by storing data (c) in the Data-Vol. Furthermore, to make the bitmap a "1", an indication can be provided to the storage controller 360 from outside, and updating can be carried out inside the storage controller 360 at either a prescribed time or a prescribed time period. Furthermore, the storage controller 360 can configure a plurality of bitmaps so as to be able to recover data at a plurality of points in time. Furthermore, the recovered data can be stored in the Recover-Vol.

Figure 6:
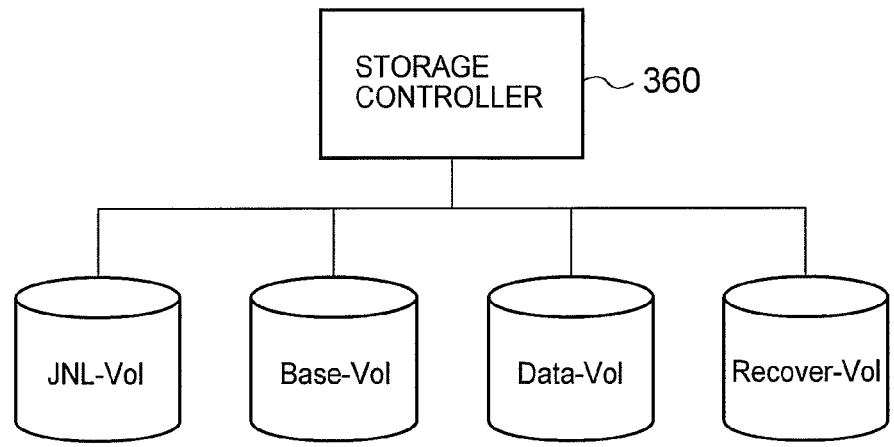
FIG. 6 shows an example of another data storage method.

FIG. 6 shows another data storage method. This is a data storage method that also makes it possible to recover data at a certain specified point in time. For the following explanation, this storage method will be called the "arbitrary time recovery storage method" here. This data storage method configures a Data-Vol that stores write-requested data; a logical volume (Base-Vol) that stores data that was stored in the Data-Vol at a certain point in time; and a logical volume (JNL-Vol) that stores journal data created from new write data. First, the storage controller 360 copies the data stored in the Data-Vol to the Base-Vol. Next, upon receiving a write request, the storage controller 360 stores the write-requested data in the Data-Vol, and also creates journal data, which adds time data and a Data-Vol identifier (Vol-ID) to the write data, and stores this journal data in the JNL-Vol. That is, journal data is created and stored in the JNL-Vol each time there is a new write request. For example, suppose that Data-Vol data at the point in time of 10:00 has been copied to the Base-Vol, and that data writes have been carried out to the Data-Vol up to the present time (for example, 11:00). In this case, the journal data from 10:00 until 11:00 will be stored in the JNL-Vol. When the data is to be recovered to the state of a prescribed time (for example, 10:30) here, the storage controller 360 copies the Base-Vol data to the Recover-Vol. Accordingly, the Recover-Vol will constitute the state at 10:00. Next, the storage controller 360 reads out from the journal data time information the write-requested data generated between 10:00 and 10:30, and stores this data in the Recover-Vol. Consequently, the Recover-Vol constitutes the state at 10:30.

Thus, the data storage methods explained using FIGS. 3, 4 and 6 are all capable of either maintaining or recovering the state of the Data-Vol at a certain point in time in the past. That is, when an abnormality occurs in either the data or a program stored in the Data-Vol, normal data or a normal program can be read out from a past Data-Vol state.

Figure 7:
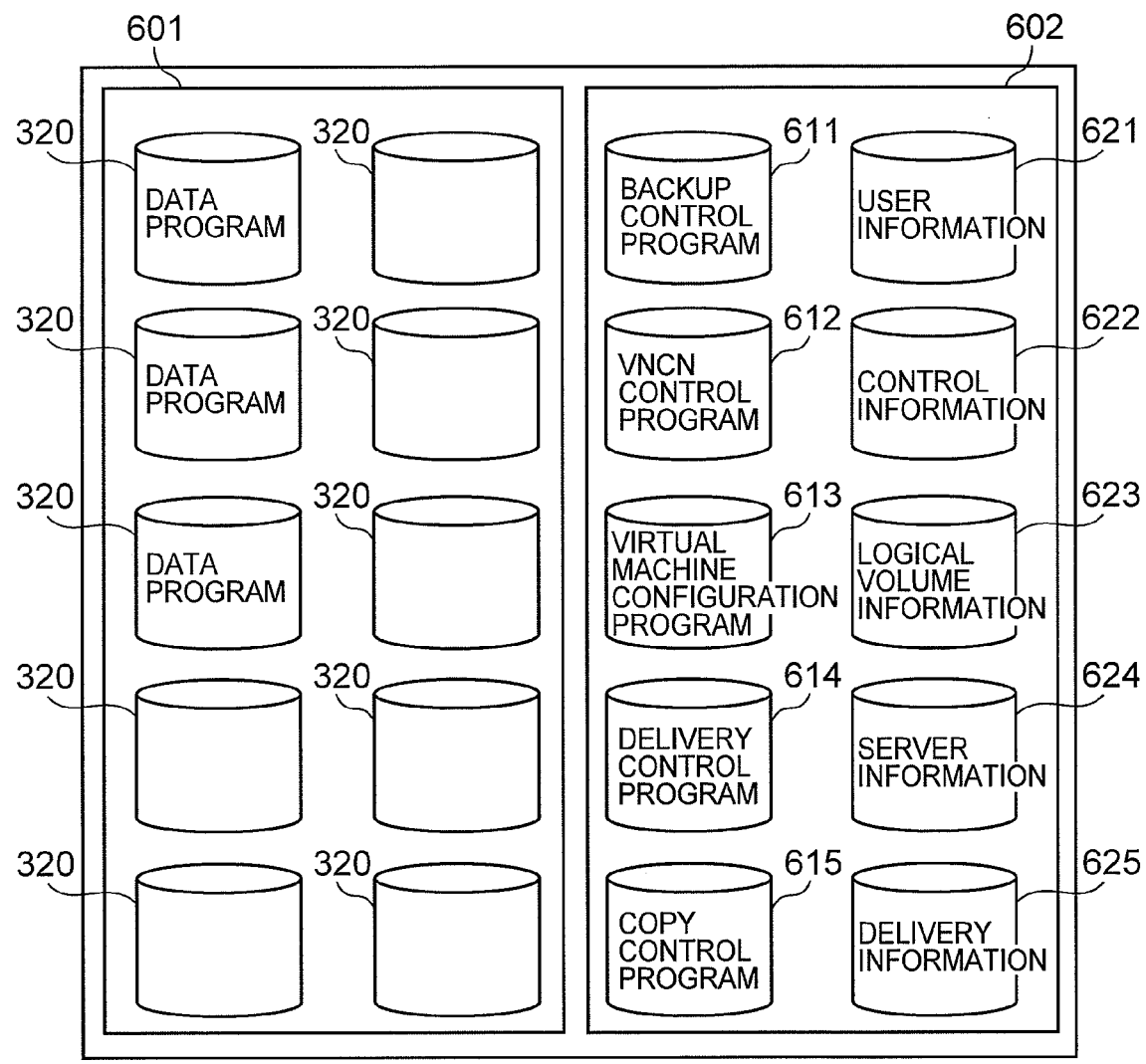
FIG. 7 shows an example of a data storage area in a storage device.

FIG. 7 shows an example of a storage area in a storage device. A plurality of logical volumes have been created in the storage device 370, and this plurality of logical volumes has been separated into a user area 601 and a control area 602. The user area 601 is used as a backup for either data or programs stored in the computer 100 storage media (FM 140, HDD 150, external storage device 200). The control area 602 is the area in which the programs and control information (control data) for executing the programs that are executed by the backup server 320, VNC server 330, delivery server 340 and storage controller 360 are stored. More specifically, there is a backup control program storage area 611; a VNC control program storage area 612; a virtual computer configuration program storage area 613; a delivery control program storage area 614; and a copy control program storage area 615. Further, the control area 602 has a user information storage area 621; a control information storage area 622; a logical volume information storage area 623; a server information storage area 624; and a delivery information storage area 625. Furthermore, FIG. 7 shows one program being stored in one logical volume, but the configuration can be such that a plurality of programs or data can be stored in a single logical volume.

The terminal device 380 is for storing the programs and control information executed by the backup server 320, VNC server 330, and delivery server 340 in the storage device 370, and for storing a program to be executed in the main memory 363 of the storage controller 360. Further, the terminal device 380 can display the location and delivery destination of a storage medium to be delivered.

An overview of the operations of this system will be explained hereinbelow.

Figure 8:
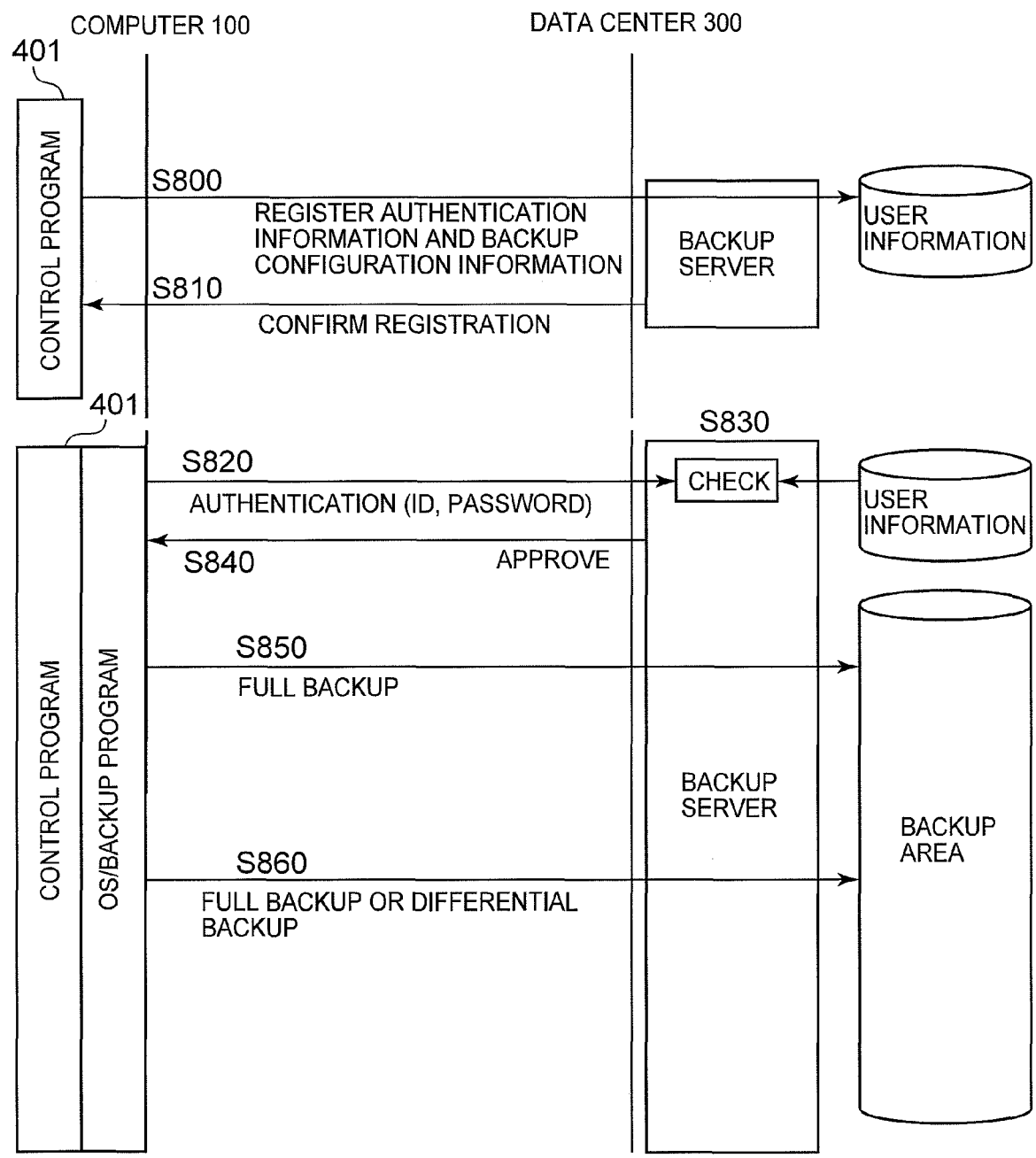
FIG. 8 shows an overview of an operation of the information processing system.

FIG. 8 shows an overview of the operation of the computer from initialization to normal operation. When the power to the computer 100 is turned ON, the control program 401 is executed, and the input of authentication information (ID, password information) from the user, and backup configuration information (information such as computer specifications and the storage media targeted for backup) is received. The inputted authentication information and backup configuration information are sent to the backup server 320, and are registered as user information 621 by the backup server 320 (S800). When registration has ended (S810), the control program 401 registers the authentication information and the backup configuration information in the FM 140 of its own computer 100. This processing will be explained in detail further below, but in accordance therewith, an area (backup area) for storing the data stored in the storage media of the computer 100 is reserved in the user area 601 of the storage device 370.

When the registration of the authentication information and backup configuration information has ended, the control program 401 boots the operating system (OS) 411 and the backup program 413, and commences normal operation. Furthermore, normal operation as used here is a state in which the user executes an application program 412 to perform a job, and in particular signifies a situation in which either a storage medium, such as the HDD 150 or external storage device 200, or a program of the operating system 411 is operating normally.

The backup program 413 carries out authentication processing with the backup server 320 (S820, S830, S840). Thereafter, the backup program 413 carries out a full backup of the backup-targeted storage medium (S850). A full backup is a process in which the backup program 413 sends all of the data stored in the target storage medium to the backup server 320, and stores the data in the backup area of the storage device 370. Furthermore, the data to be stored in the backup area is all of the data that is stored in the target storage medium, and comprises programs such as the operating system, and data such as user data.

Subsequent to carrying out this full backup, at a prescribed timing the backup program 413 carries out either a full backup or a differential backup, and updates the data in the backup area (S860). A differential backup here is a process in which the backup program 413 sends to the backup server 320 only data (update data) that has been written to the storage medium of the computer 100 anew, and stores this data in the backup area. The differential backup is advantageous in that less data is sent than in a full backup. This full backup or differential backup is carried out continuously at a prescribed timing while the backup program 413 is being executed.

Furthermore, as explained here, the backup program 413 is executed by the control program, but this program 413 can also be an application program of the operating system (OS). That is, it can be a program that is executed by the operating system.

Figure 9:
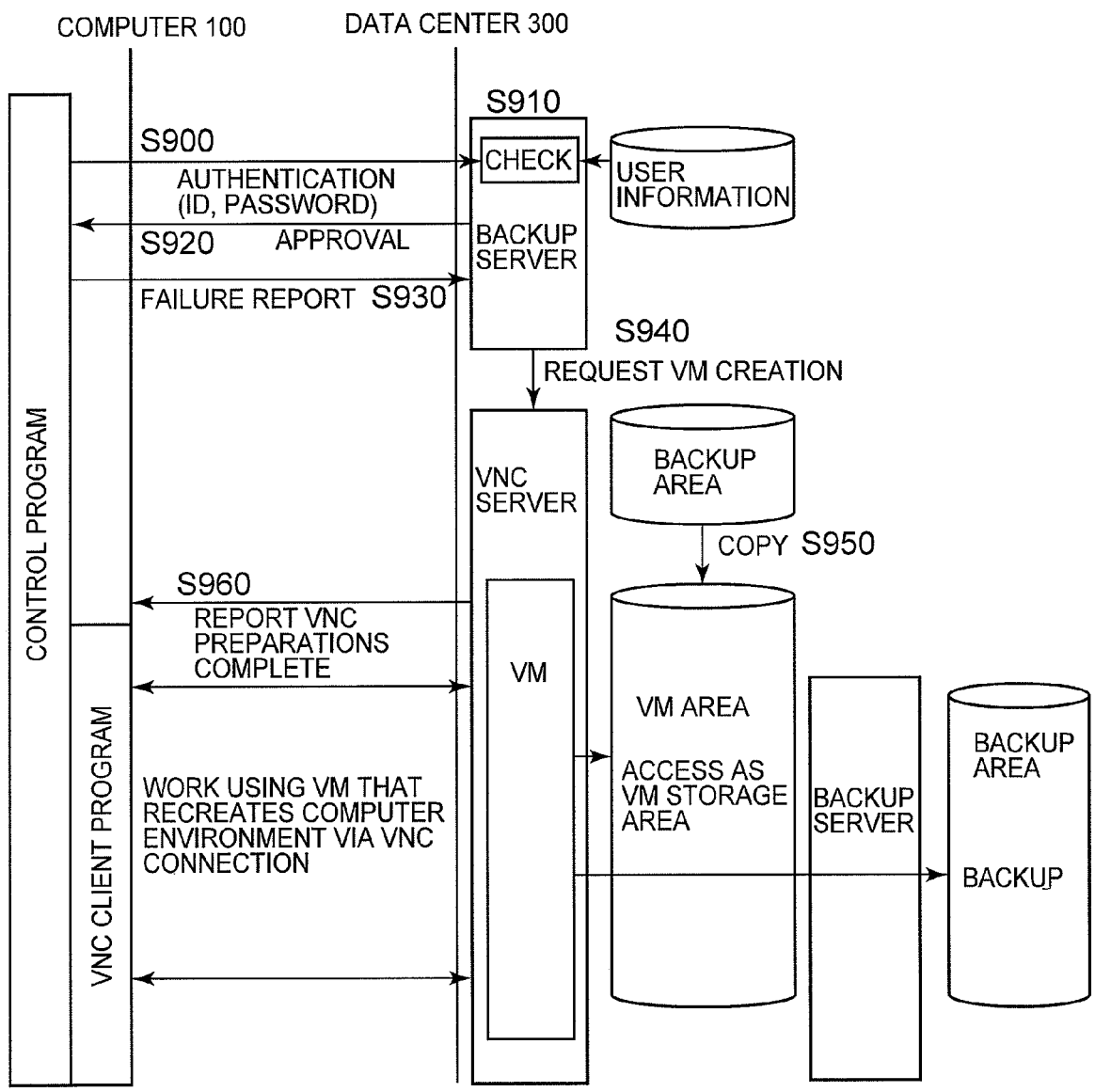
FIG. 9 shows an overview of an operation of the information processing system.

FIG. 9 shows an overview of processing when there is a failure of the storage medium.

The control program 401, upon detecting the failure of the storage medium, executes authentication processing (S900, S910, S920) with the backup server 320, and when authentication processing has ended, sends information about the failed computer 100 storage medium to the backup server 320 (S930).

The backup server 320 requests the VNC server 330 for a virtual-computer (VM: Virtual Machine) configuration (S940). The VNC server 330, which receives the request, reserves a storage area (VM area) to be used by the virtual machine, and either copies or recovers the data stored in the backup area to the VM area (S950). A recovery is used because, in the case of the already explained "snapshot storage method" and "arbitrary time recovery storage method", data is not simply copied data, but rather is usable data from a prescribed point in time. The data to be copied to the VM area is all the data that is stored in the backup area, and this data also comprises the operating system and programs such as application programs. Further, the VNC server 330 creates a virtual machine, executes the VNC control program 612, and sends a notification to the computer 100, which is the source of the failure information, to the effect that VNC preparation is complete (S960). The computer 100, which receives the VNC preparation-complete notification, executes the VNC client program 402. The VNC client program 402 carries out communication with the VNC server 330, and executes the VNC control program 612. The VNC client program 402 sends an input operation that the user carried out on the computer 100 to the VNC server 330 as information (input operation information). The VNC control program 612 of the VNC server 330 executes processing based on the input operation information. For example, this processing can be the execution of various types of programs, or the reading out of data. The VNC control program 612 sends screen information executed in accordance with this input operation information to the computer. That is, the virtual machine created by the VNC server 330 constitutes a remote machine, and it is possible for the user to continue a job using the operating system and application program executed by this virtual machine. Further, data that has been updated by an application program executed by the virtual machine is stored in the VM area. Further, the backup program 413 that is booted on the virtual machine treats the VM area as the backup source, and requests the backup server 320 for either a full backup or a differential backup at a prescribed timing the same as the backup program executed by the computer 100.

Figure 10:
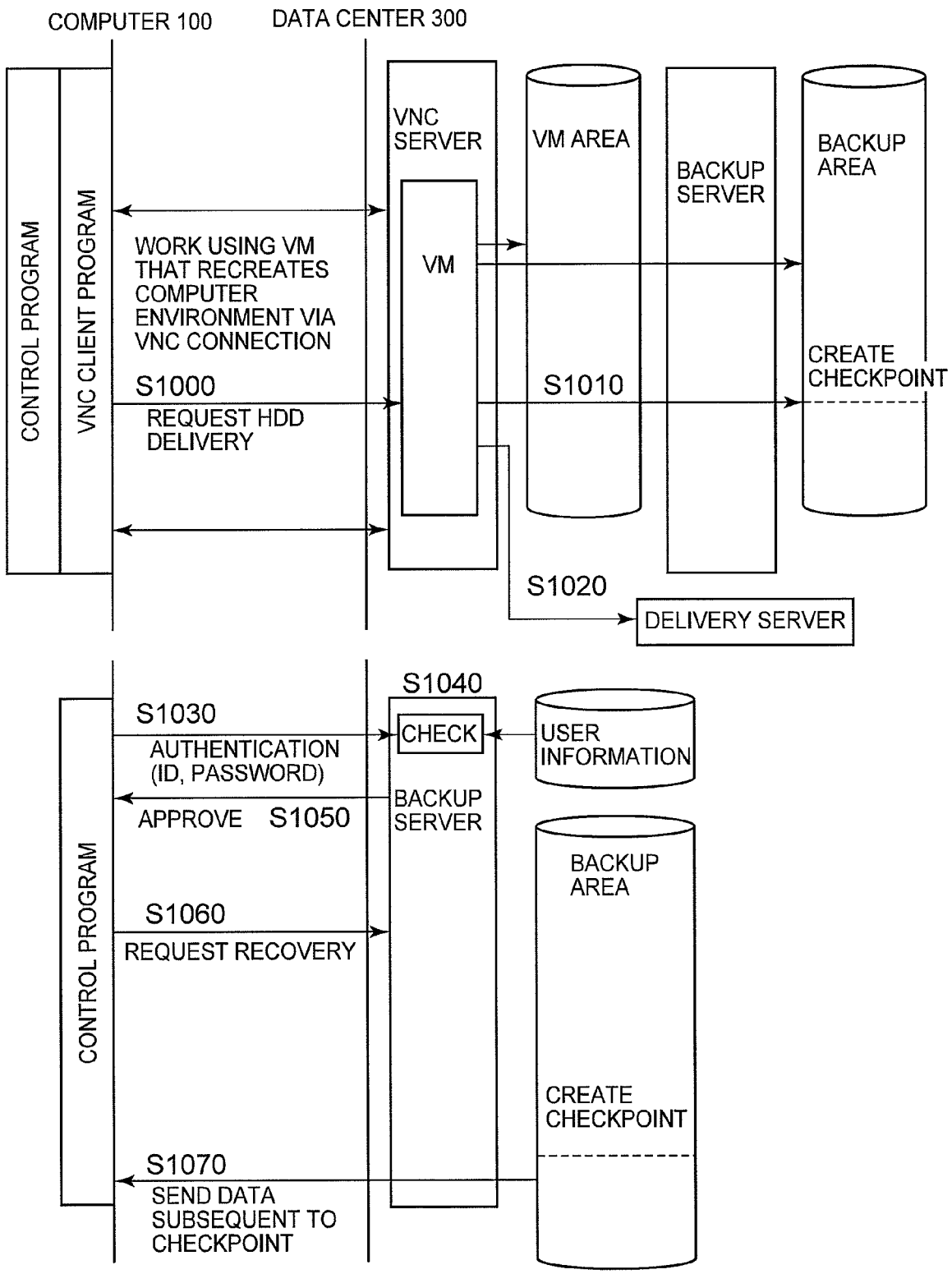
FIG. 10 shows an overview of an operation of the information processing system.

FIG. 10 shows the processing from the requesting of a delivery for a failed storage medium until the realization of a state in which a job can be started by a computer having a normal storage medium.

When the user carries out a delivery request for a storage medium, such as the HDD 150, in a state in which a virtual machine is configured in the VNC server 330 (S1000), the VNC server 320 transfers the delivery request to the backup server 320. The backup server 320, which receives the delivery request, creates a checkpoint to confirm the backup data up until the current point in time (S1010), and transfers the delivery request once again to the delivery server 340 (S1020). The delivery server 340 determines a storage medium that can be used by the computer 100 in accordance with the delivery request, and stores data up to the prepared checkpoint in the determined storage medium.

The computer 100, which configured the sent storage medium in accordance with the delivery request, carries out authentication processing with the backup server 320 to achieve consistency with the data stored in the backup area (S1030, S1040, S1050), and sends a recovery request to the backup server 320 (S1060). The backup server 320 reads out the data at and beyond the checkpoint from the backup area, and sends this data to the computer 100 (S1070).

Consequently, for example, new data created by executing a job using the virtual machine can be stored in the storage medium of the computer 100 between the delivery of the storage medium and the configuration of the storage medium in the computer 100.

Furthermore, an example of carrying out a delivery request in a state in which the computer 100 and VNC server 330 are connected by a VNC connection is shown here, but as explained using FIG. 9, a delivery request can also be carried out at the point in time when the failure of the computer 100 storage medium was detected. Furthermore, a case in which a delivery request is carried out at the point in time when a failure is detected will also be explained hereinbelow.

Figure 11:
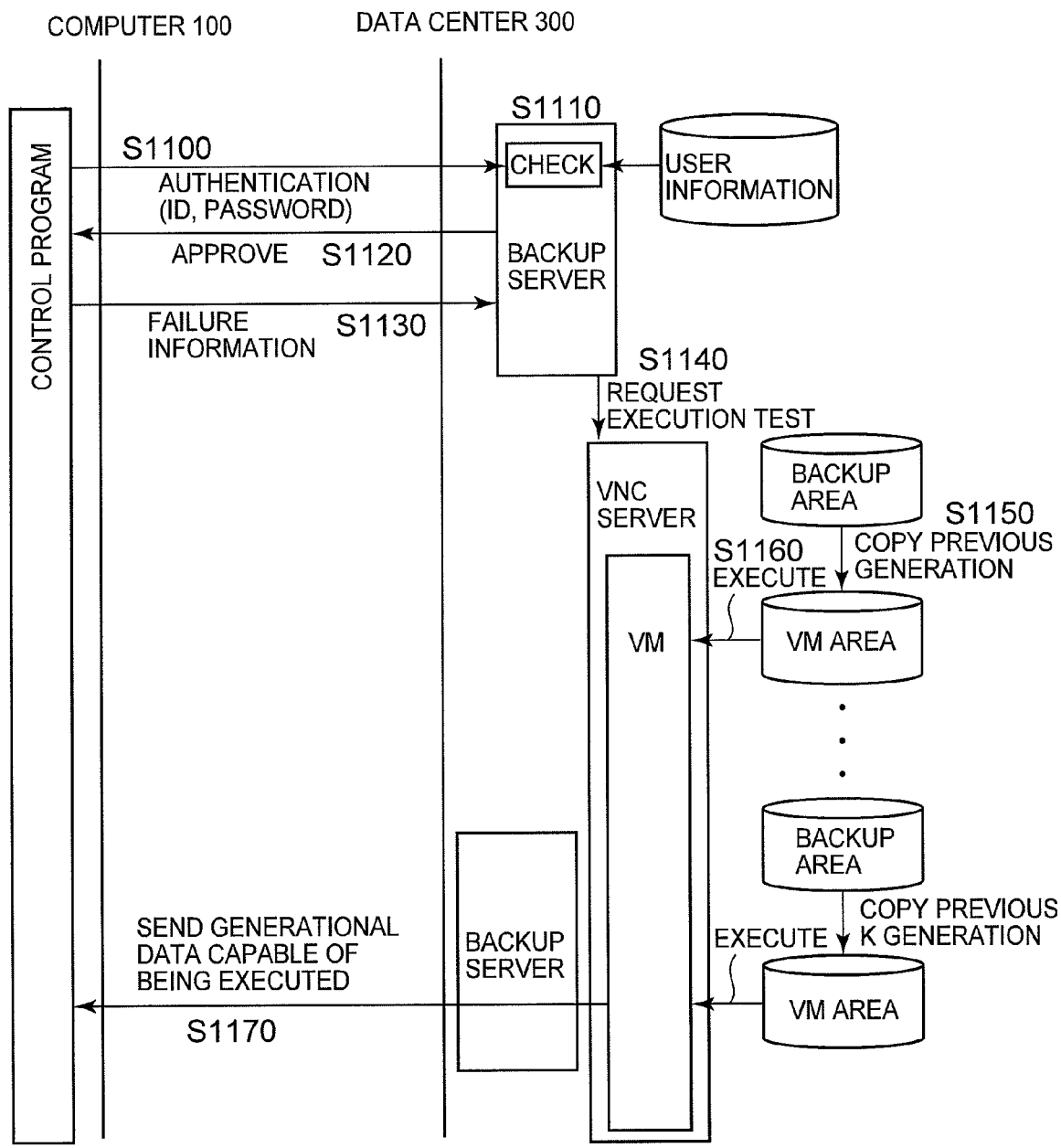
FIG. 11 shows an overview of an operation of the information processing system.

FIG. 11 shows the processing when a failure occurs in either the operating system or an application program being executed by the computer. The control program 401, upon detecting the failure of either the operating system 411 or the application program 412, carries out authentication processing (S1100, S1110, S1120), and notifies the backup server 320 of the failure information (S1130). The backup server 320, which receives the failure information, requests the VNC server 330 for an execution test (S1140). The VNC server 330, which receives the request, specifies either the operating system or the application program from the failure information, and copies same from the backup area to the VM area (S1150).

Then, the VNC server 330 creates a virtual machine, and executes either the operating system or application program that was copied to the VM area (S1160). If it is ascertained here that the program is operating normally, the VNC server 330 notifies the backup server 320 that the program is normal, and the backup server 320 sends the normally operating program to the requesting computer (S1170). When either the operating system or application program does not operate normally on the virtual machine, the VNC server 330 specifies either the operating system or the application program from backup data of an older point in time, and ascertains if this program operates normally. That is, the VNC server 330 restores the program to the state of a past point in time using the data storage method explained using FIGS. 3, 4 and 6. If the result is that the program operates normally, the VNC server 330 sends the normally operating program from the backup server 320 to the requesting computer, and if the program does not operate normally, the VNC server 330 notifies the computer 100 by way of the backup server 320 that none of the programs operate normally.

The preceding is the operation of the entire system shown in FIG. 1. Next, the processing of the respective programs will be explained.

Figure 12:
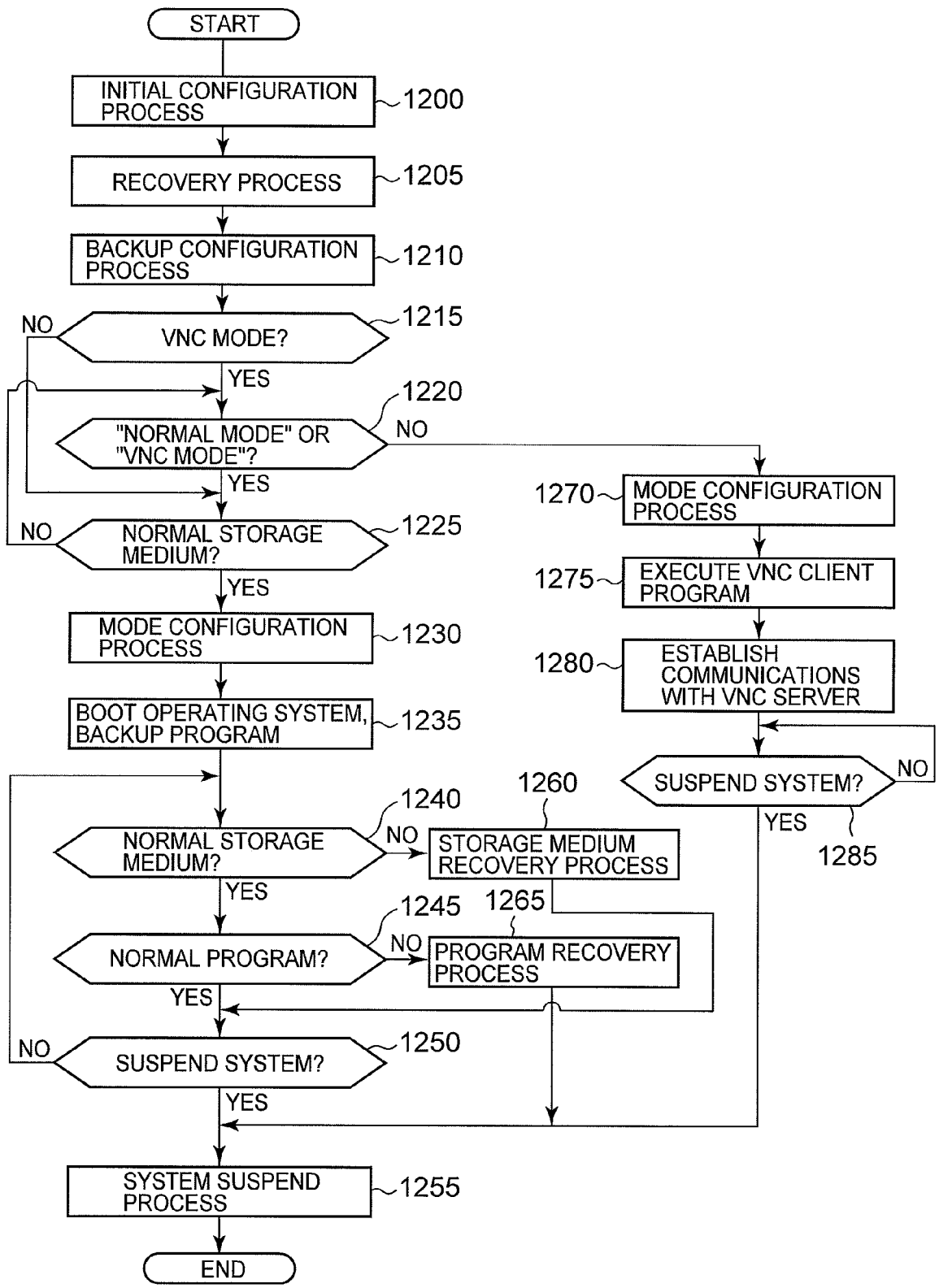
FIG. 12 shows the processing of a control program.

FIG. 12 shows the processing of the control program.

The control program 401 is executed when the computer 100 is powered ON. The control program 401 first carries out an initial configuration process based on the configuration information stored in the FM 140 (S1200).

FIG. 13 shows an example of configuration information. The configuration information 403 items include initial configuration information, authentication information, backup configuration information, operating mode information and server information. The initial configuration information is used in the initial configuration process, and, for example, the CPU clock, CPU voltage, boot drive and so forth are configured. Furthermore, this initial configuration process configures the CPU 120, memory 130, input device 180, display device 190, and external storage device 200 of the computer 100 the same as the BIOS (Basic Input/Output System).

When the initial configuration process has ended, the control program 401 carries out a recovery process (S1205). This is equivalent to the recovery request explained using FIG. 10, and is processing that is carried out when the storage medium of computer 100 is replaced by a new storage medium. This processing will be explained in detail further below.

Next, the control program 401 carries out a backup configuration process (S1210). This is a process that carries out the initial configuration for carrying out a backup of either the data or a program stored in the computer 100 storage medium (FM140, HDD150, or external storage device 200). This process will be described further below.

When the backup configuration process has ended, the control program 401 determines if it is the VNC mode (S1215). This determination is made in accordance with the operating mode of the configuration information 403. There are two types of operating modes, the normal mode and the VNC mode. In the normal mode, the CPU 120 of the computer 100 executes the programs, such as the operating system 411 and application program 412. In the VNC mode, the CPU of the VNC server 330 executes the programs, such as the operating system 411 and application program 412, and the VNC server 330 is utilized just like the computer 100 itself. When in the VNC mode (S1215: "Y"), the user is queried as to which of the "normal mode" or "VNC mode" is to be executed (S1220). When the normal mode is specified ("Normal Mode" in S1220), next the control program 401 determines if the storage medium is normal (S1225). The storage medium here is either the HDD150 or the external storage device 200 in which the operating system and application program, which is to carry out the job on the computer, are stored. Furthermore, this storage medium is the storage medium specified by the user as the backup target in S1210. The control program 401 determines if a device is normal by sending and receiving a specified signal to and from the respective devices, such as the CPU120, memory 130, FM140, HDD150, input device 180, display device 190, and external storage device 200. When it is determined here that the storage medium is abnormal, the control program 401 determines if the abnormal storage medium is the configuration information 402 backup target, and if the abnormal storage medium is the backup target, configures abnormal as the status.

When the specified storage medium is not normal (S1225: "N"), the operating system and so forth cannot be read out because this storage medium is abnormal. Therefore, since the job cannot be executed in the normal mode, the control program 401 returns to S1220 and queries the user once again as to which of the "normal mode" or "VNC mode" is to be executed. Furthermore, when querying the user once again, the control program 401 can also display the fact that the storage medium is abnormal. A determination is made in S1225 as to whether or not the storage medium is normal the same as when the mode is not the VNC mode (S1215: "N"). Similarly, when the storage medium is abnormal (S1225:

"N"), the control program 401 queries the user once again in S1220 as to whether the mode will be switched.

When it is determined that the storage medium is normal (S1225: "Y"), the control program 401 configures "Normal Mode" in the operating mode field of the configuration information 403 (S1230), and executes the operating system 411 and backup program 413 (S1235). The execution of the application program thereafter is carried out in accordance with an indication from the user.

When the operating system 411 and backup program 413 are executed, the control program 401 monitors the status of the storage medium and the status of the operating system (OS) (S1240, S1245) until the system finishes (S1250: "Y"). Furthermore, when the storage medium is abnormal, the control program 401 configures abnormal as the status of the backup target in the configuration information.

Figure 29:
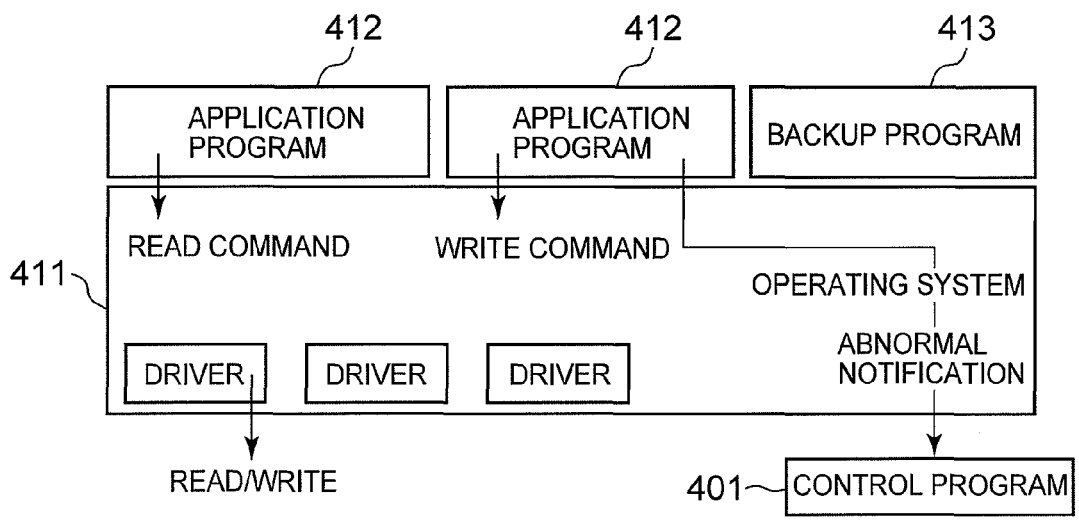
FIG. 29 shows an overview of a program executed by the computer.

FIG. 29 shows a model of when the operating system 411, application program 412, backup program 413 and control program 401 are executed by the computer 100. When either a data read or write is to be carried out, the application program 412 sends the operating system 411 either a data read or write command. The operating system 411 carries out either a data write to or a data read from the storage medium by way of a driver that is configured for each storage medium. The control program 401 regularly issues commands to the operating system 411, and determines that the operating system 411 is normal when a response is received from the operating system 411, and determines that the operating system 411 is abnormal when a response is not received. Further, the operating system 411 regularly issues commands to the application program 412, and determines that the application program 412 is normal when a response is received from the application program 412, and determines that the application program 412 is abnormal when a response is not received, and when the application program 412 is abnormal, notifies the control program 401 as well. Further, the operating system 411 executes either a data write or read to/from the storage medium via the driver, but when there is no response from the storage medium relative to either the write or read, determines this storage medium to be abnormal, and notifies the control program 401 to this effect. In this way, the control program 401 detects the abnormality of the storage medium, operating system and application program.

When the storage medium is abnormal (S1240: "N"), the control program 401 executes a storage medium recovery process (S1260). Further, when a program is abnormal (S1250: "N"), the control program 401 executes a program recovery process (S1265). The storage medium and program recovery processes will be explained further below.

The control program 401, upon receiving a system suspend request from the operating system 411 (S1250: "Y"), suspends the operating system and backup program, and executes processing to turn OFF the power (S1250).

When a VNC mode indication is received in S1220, the control program 401 configures "VNC Mode" in the operating mode field of the configuration information 403 (S1270), executes the VNC client program 402 (S1275), and establishes communications with the VNC server 330 (S1280). The establishment of communications with the VNC server 330 is carried out based on the Internet host name of the VNC server 330, which is stored in the configuration information 403. Furthermore, the Internet host name is used here as the information for specifying the server, but if there is information that specifies another server, this information can also be used. The VNC client program 402 carries out authentication processing with the VNC server 330, displays image data sent from the VNC server 330, and carries out processing for sending the input information of the input device (key information inputted from the keyboard, and mouse location information) to the VNC server 330.

Upon receiving a system suspend indication after executing the VNC client program 402 (S1285: "Y"), the control program 401 suspends the VNC client program 403 and ends processing.

Figure 14:
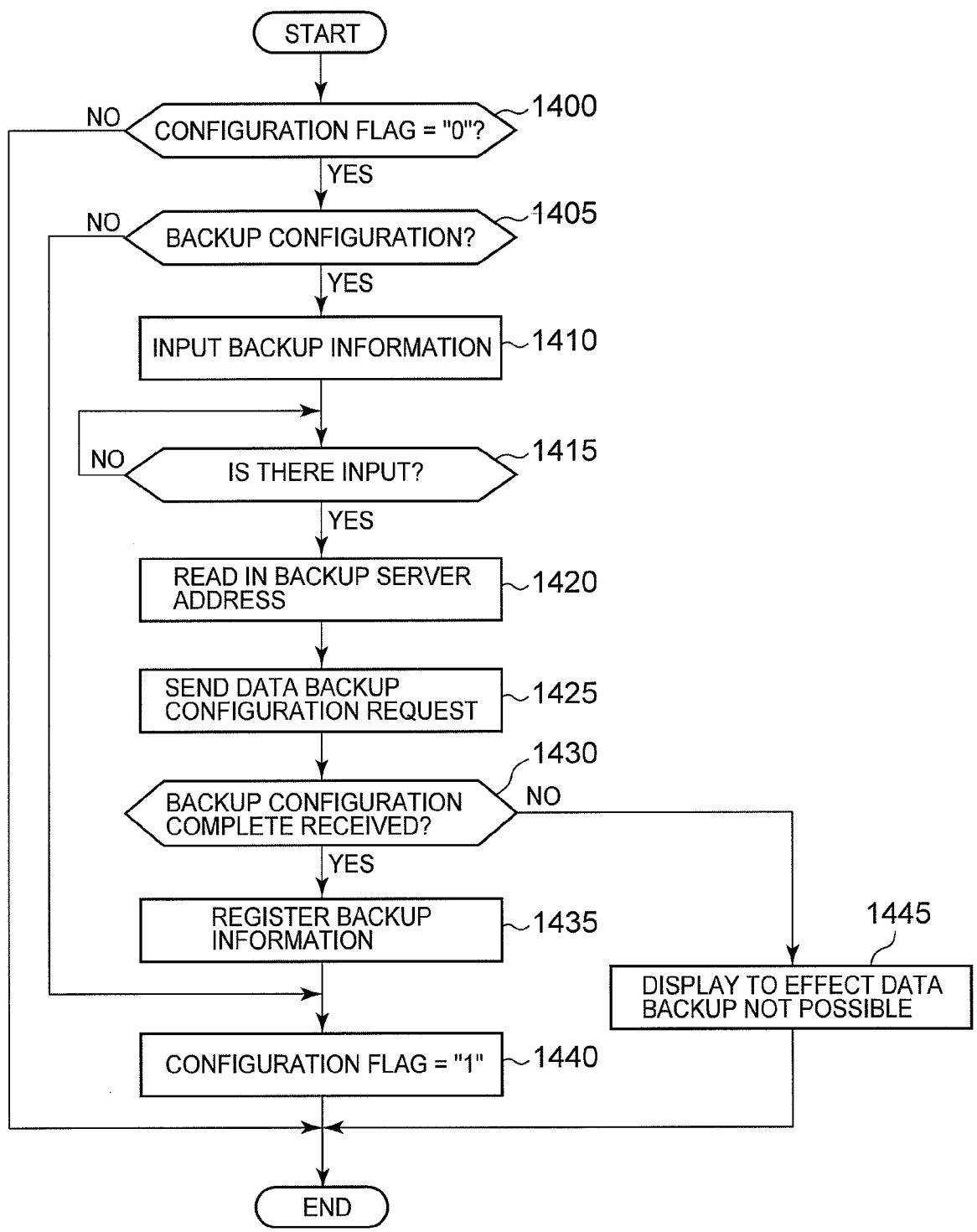
FIG. 14 shows a backup configuration process executed by the control program.

FIG. 14 shows a backup configuration process executed by the control program.

First, the control program 401 determines if the configuration flag of the configuration information 403 backup configuration item is "0" (S1400). When the configuration flag is set to "1", either a backup configuration is already being carried out, or the user has determined that a backup configuration is not necessary. Therefore, processing ends when the configuration flag is "1". When the configuration flag is "0", the user has yet to make a determination as to the backup configuration.

When the configuration flag is "0" (S1400: "Y"), the control program 401 queries the user as to whether or not a backup configuration is to be carried out (S1405). When the user determines that a backup configuration is not needed (S1405: "N"), the control program 410 configures "1" in the configuration flag in S1440, and ends processing. Conversely, when the user determines that a backup configuration is necessary (S1405: "Y"), the control program 401 issues an indication to the user to input authentication information and backup configuration information. The authentication information is the ID, password (PW), and user address. Further, the backup configuration information is the backup target, the serial number of the backup target, the capacity of the backup target, the computer serial number, the backup generation, the backup method, and the backup timing. The backup target here is the FM140, HDD150 or external storage device 200 managed by the computer 100 control program 401 and operating system 411. The user specifies either one or a plurality of backup targets from thereamong. The backup target, the backup target serial number, the backup target capacity, and the computer serial number are information for selecting a capacity and a substitute storage medium for storing backup data at the data center 300. Therefore, if the backup target serial number and the computer serial number can be used to select a capacity and a substitute storage medium at the data center side, the backup target serial number and the computer serial number can be registered.

The backup method specifies if a full backup or a differential backup is to be carried out to the specified backup target in the normal mode. The backup timing specifies the timing at which the backup will be carried out in the normal mode, and can be specified using the timing stored in the HDD, a backup indication from the user, or a cycle (every minute, every hour, or every day).

The control program 401 waits for the authentication information and backup configuration information to be inputted from the user (S1415: "N"), and after inputting has ended (S1415: "Y"), reads out the Internet host name of the backup server 320 from the configuration information 403 (S1420), and sends a backup configuration request to the backup server 320 (S1425). The inputted authentication information and backup configuration information is also sent to the backup server 320 in this backup configuration request. Furthermore, the backup server address can be registered in the FM140 when the computer is shipped from the factory, or the user can input the Internet host name directly.

Upon receiving a notification from the backup server 320 that the backup configuration has ended (S1430: "Y"), the control program 401 registers the inputted authentication information and backup configuration information as the configuration information 403 of the FM140 (S1435), configures the configuration flag to "1" (S1440), and ends processing. Furthermore, when the Internet host name of another server is received from the backup server 320, the control program 401 registers this Internet host name as the configuration information 403.

Conversely, upon receiving a notification from the backup server 320 to the effect that a backup configuration cannot be carried out (S1430: "N"), the control program 401 carries out a display to the effect that backup cannot be carried out (S1445), and ends processing.

Figure 15:
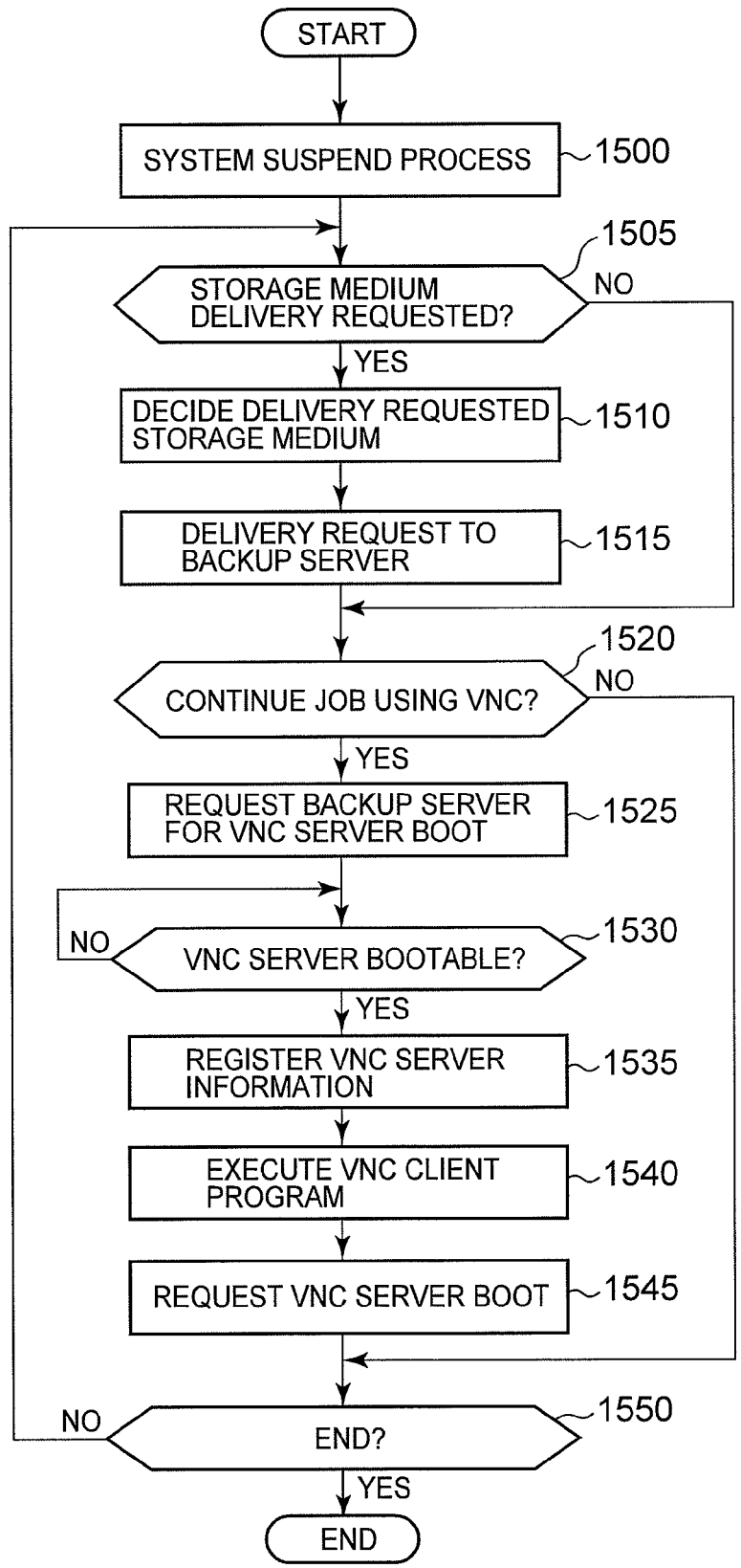
FIG. 15 shows a storage medium recovery process executed by the control program.

FIG. 15 shows the storage medium recovery process executed by the control program.

The control program 401 executes the storage medium recovery program (S1260) upon detecting an abnormal storage medium.

First, the control program 401 carries out a system suspend process (S1500). This is the process that suspends the operating system 411, application program 412, and backup program 413 that are being executed. Consequently, the operating system 411, application program 412, and backup program 413 are deleted from the memory 130 of the computer 100.

Next, the control program 410 queries the user as to whether or not to deliver the storage medium that constitutes the backup target (S1505), and when the user issues a delivery request (S1505: "Y"), decides the storage medium to be delivered (S1510). This decision specifies the failed storage medium when a plurality of storage media is configured as backup targets in the configuration information management table. As explained hereinabove, the control program 401 is able to detect the failed storage medium. Furthermore, the user can specify the storage medium to be delivered.

Furthermore, when there is an input to the effect that storage medium delivery is not needed (S1505: "N"), the control program 401 moves to the processing of S1520.

Once the storage medium to be delivered has been decided, the control program 401 sends a delivery request to the backup server 320 (S1515). Next, the control program 401 asks the user if the job is to be continued on the VNC server 330 (S1520). When an input to the effect that the job is to be continued on the VNC server 330 is made by the user (S1520: "Y"), the control program 401 sends authentication information and a VNC server 330 boot request to the backup server 320 (S1525). Upon receiving a notification from the VNC server 330 to the effect that booting is possible (S1530: "Y"), the control program 401 registers the Internet host name of the VNC server 330 as the configuration information (S1535), and executes the VNC client program (S1540). Thereafter, the control program 401 establishes communications with the VNC server 330 (S1545), and ends processing.

Conversely, when an input to the effect that it will not be necessary to continue the job continuation on the VNC has been made (S1520: "N"), the control program 401 ends processing.

Furthermore, a query is made in S1520 here as to whether or not the job is to be continued on the VNC server 330, but this process (S1520) can be eliminated, and the control program 401 can immediately carry out the processing of S1525.

Furthermore, even if a delivery request is not carried out in S1505, as has already been explained using FIG. 10, a delivery request can be made to the VNC server 330.

Figure 16:
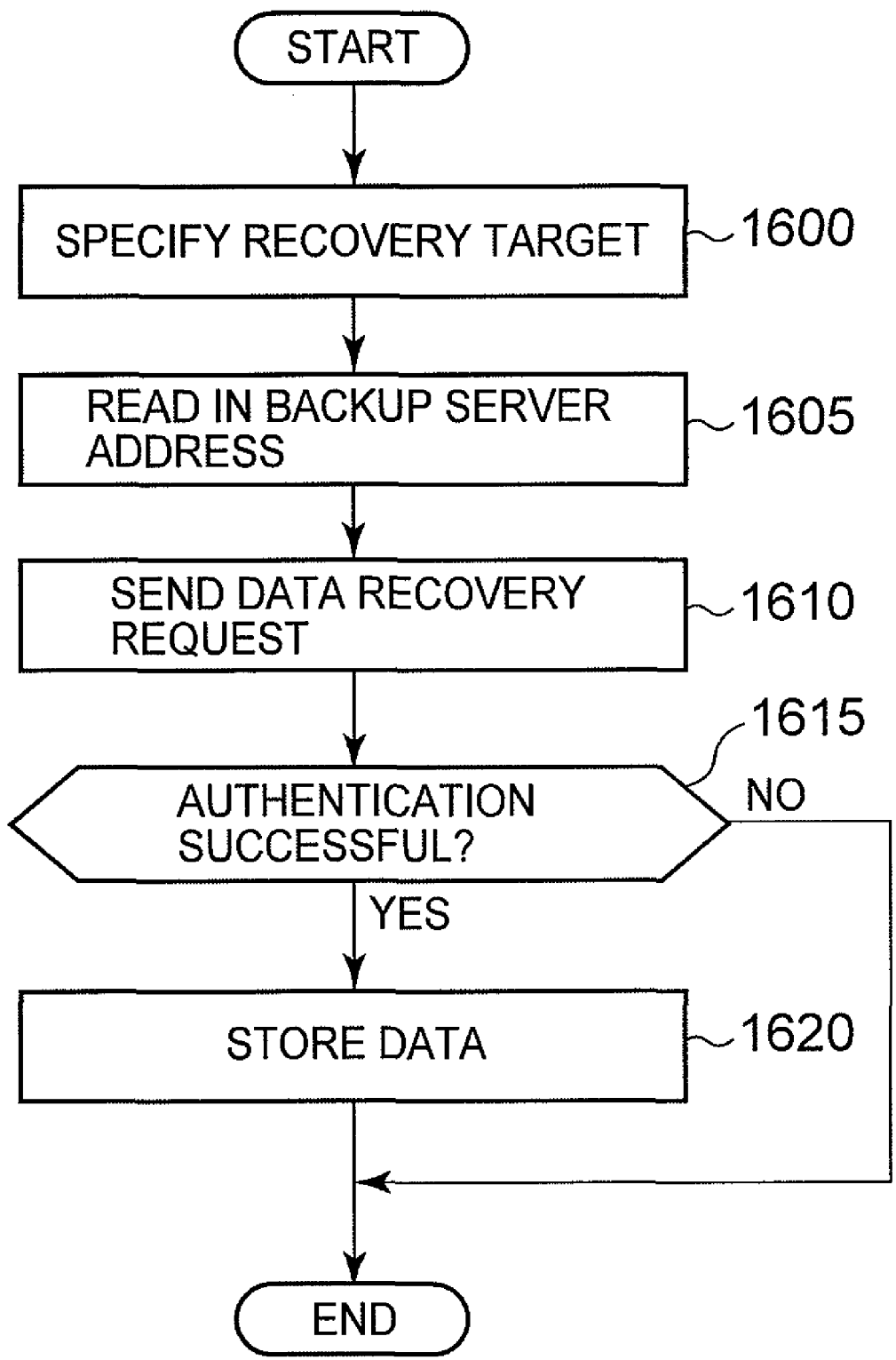
FIG. 16 shows a program recovery process executed by the control program.

FIG. 16 shows a program recovery process executed by the control program.

When a program recovery process is to be executed, the control program 401 specifies the program to be recovered (S1600). As was explained hereinabove, the control program 401 can detect a failed program, and consequently specifies this failed program. Next, the control program 401 reads in the backup server 320 Internet host name and authentication information from the configuration information 403 (S1605), and sends a data recovery request to the backup server 320 together with the specified data information (S1610). If a notification to the effect that authentication is not possible is received from the backup server 320 (S1615: "N"), the control program 401 ends processing. Conversely, if authentication is possible and data is received from the backup server 320, the control program 401 stores the received data in the storage medium in which the specified data is being stored (S1620), and once all the data has been stored, ends processing.

Figure 17:
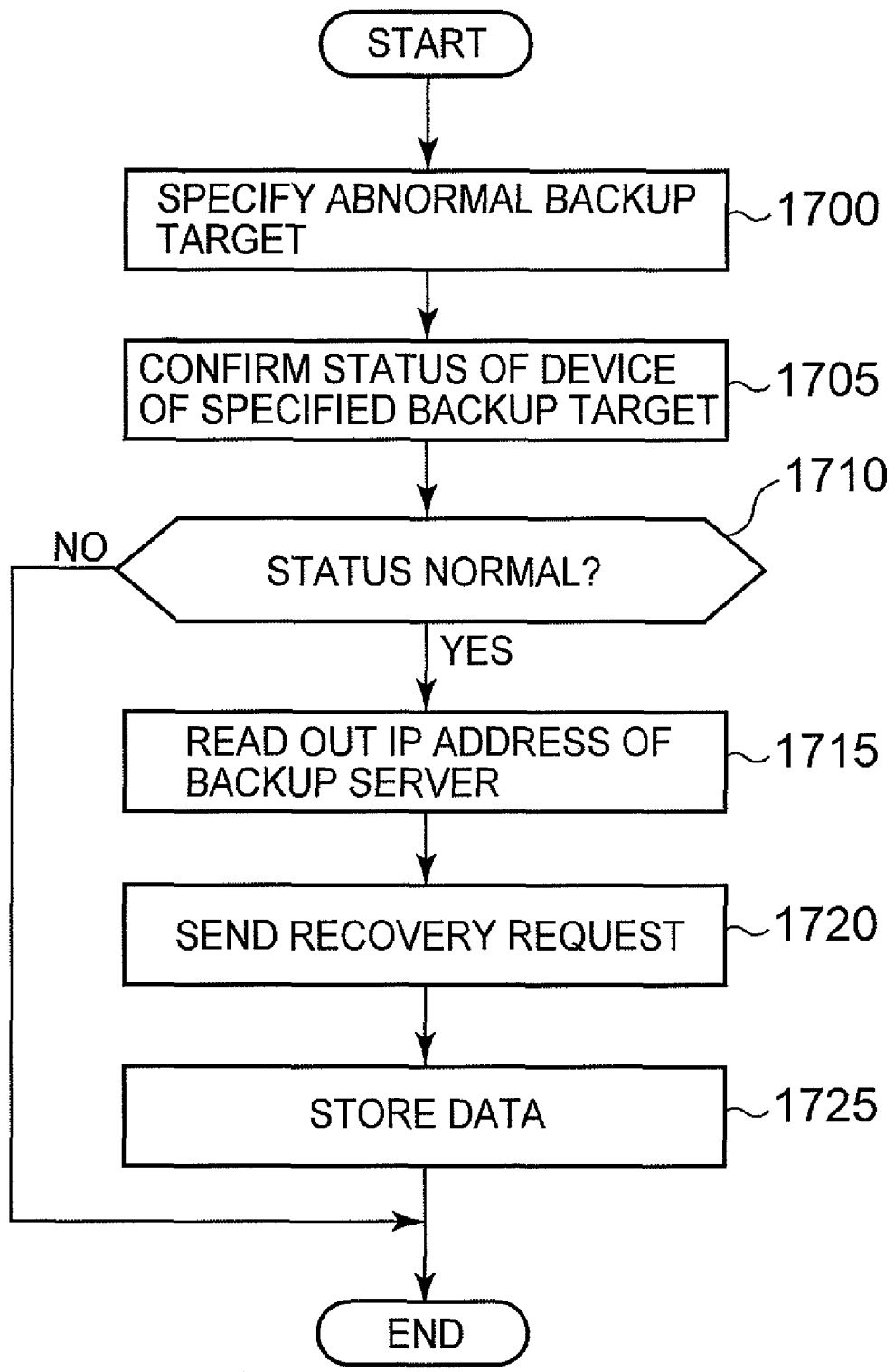
FIG. 17 shows a recovery process executed by the control program.

FIG. 17 shows a recovery process executed by the control program.

The control program 401 specifies a backup target with backup target status information of abnormal from the backup configuration information field of the configuration information 403 (S1700).

Next, the control program 401 checks the device status of the backup target to see if this backup target is normal (S1705). This check sends a control signal to the storage medium constituted as the backup target to determine whether or not there is a response. Consequently, when there is a response, the control program 401 determines that the backup target is normal, and when there is no response, the control program 401 determines that the backup target is abnormal. Next, when the result of the check of S1505 is "Normal" (S1710: "Y"), the control program 401 determines that the backup target storage medium has either been replaced with a normal storage medium, or has been recovered to the normal state, and reads out the Internet host name and authentication information of the backup server 320 from the configuration information 403 (S1715). Then, the control program 401 sends a backup data recovery request to the backup server 320 together with the information of the backup target that constitutes the normal storage medium (S1720). The control program 401, upon receiving the data from the backup server 320, stores the received data in the backup target storage medium (S1725). Once all the data has been stored, the control program ends processing. Furthermore, a program is also comprised in the data sent from the backup server 320.

Next, the processing of the backup program 413 executed by the computer 100 will be explained.

Figure 18:
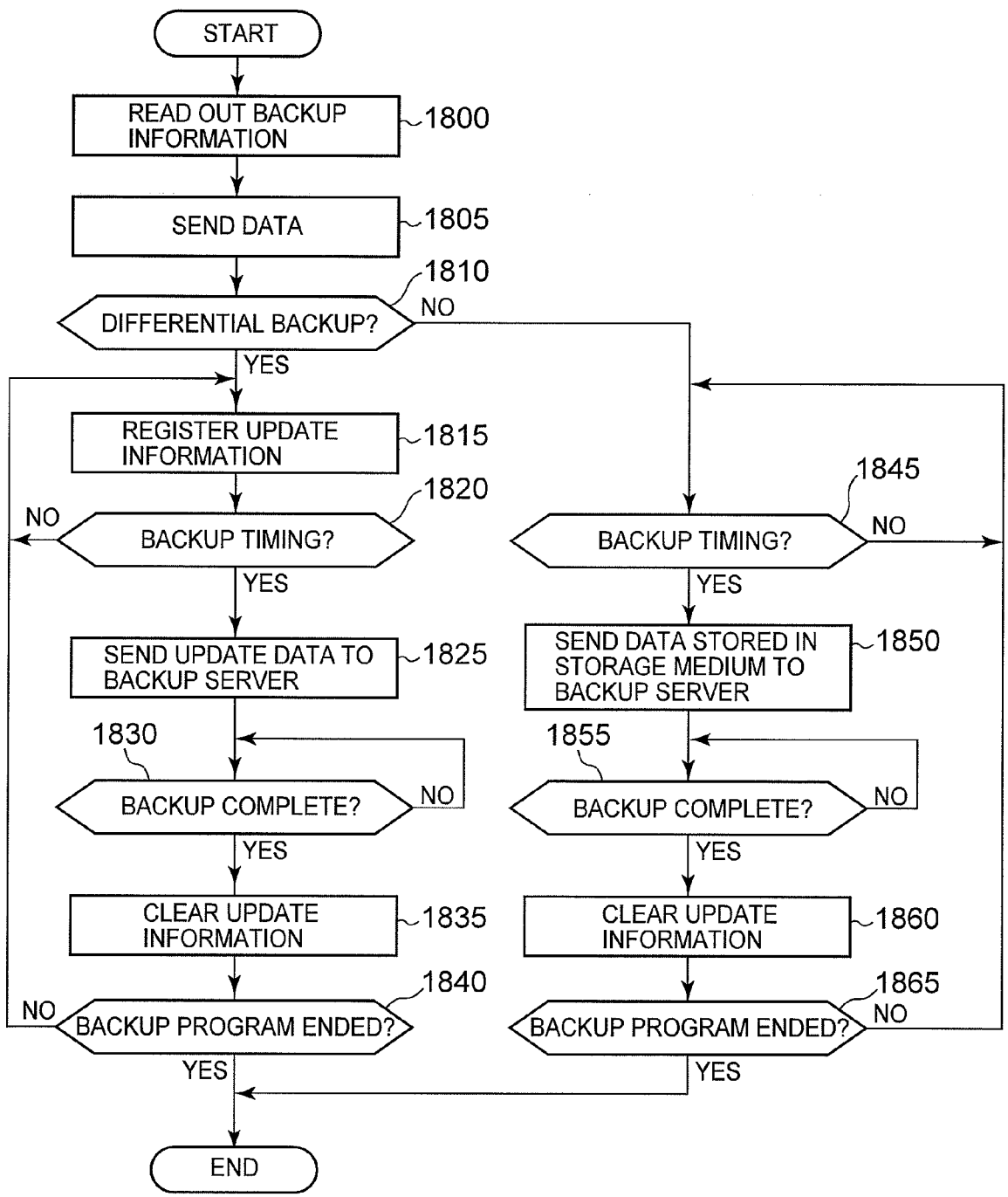
FIG. 18 shows a backup program process.

FIG. 18 shows the processing of the backup program.

The execution of the backup program 413 is started and ended by the control program 401.

First, upon being executed, the backup program 413 reads in the backup configuration information from the FM140 (S1800), and sends all the data stored in the storage medium constituted as the backup target to the backup server (S1805). The sending of all the data stored in the storage medium is carried out in either file units or block units. In the case of file units, since file information, program information and directory information stored in the storage medium is read out by the operating system, the backup program 413 sequentially reads out that data in accordance with this information, and sends this data to the backup server. Conversely, for a block unit backup, the backup program 413 sequentially reads out the data from all the addresses of the storage medium, and sends this data to the backup server.

Figure 19:
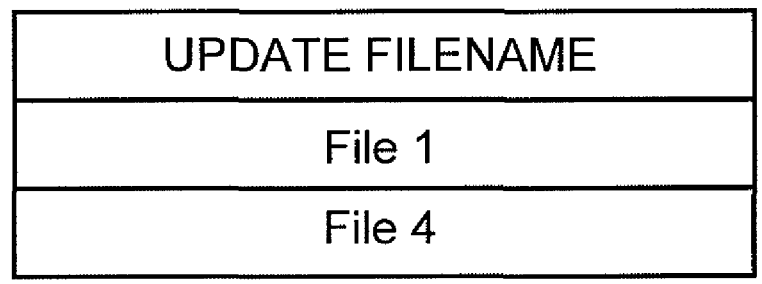
FIG. 19 shows an example of a file management table.
Figure 20:
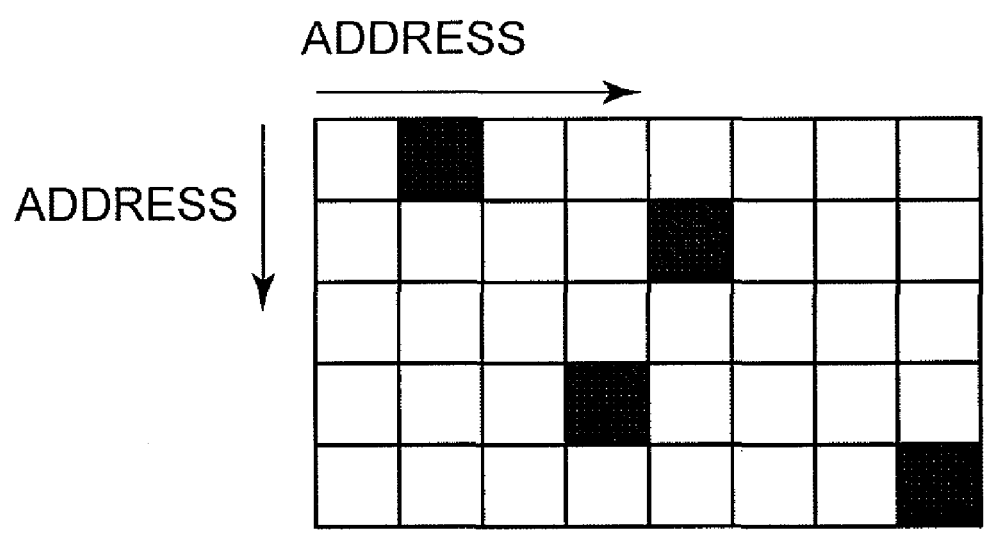
FIG. 20 shows an example of a bitmap for managing a storage area.

Next, the backup program 413 determines if the backup method is a differential backup (S1810), and if the backup method is a differential backup, registers the update information (S1815). This is a process in which the backup program 413 registers this update information as either a file or data, which has been updated in either file units or block units. In the case of file units, a file is read out to the memory 130 by the application program 412 or the like via the operating system 411, the file data is updated in the memory 130, and the updated file is stored in the HDD 150 via the operating system 411 once again. The backup program 413 stores the updated file in the file management table as shown in FIG. 19. Furthermore, a newly registered file is also similarly stored in the file management table by the application program 412. Further, in the case of block units, the area of the storage medium is partitioned into and managed as certain areas (blocks) as shown in FIG. 20. When the data updating is carried out by the application program 412, data is updated for each block unit. Therefore, the updated blocks are managed inside the storage medium by placing a bit in an updated block.

Next, the backup program 413 determines if the prescribed backup timing has arrived (S1820), and if the prescribed backup timing has arrived, sends the updated data to the backup server 320 (S1825). In the case of file units, the backup program 413 sends the file registered in the file management table to the backup server 320, and in the case of block units, sends the data in the area in which a bit has been configured in the block management table to the backup server 320.

Upon receiving a notification from the backup server 320 that backup is complete (S1830: "Y"), the backup program 413 clears the update information (S1835). That is, in the case of file units, the backup program 413 clears the registered information of the file management table, and in the case of block units, clears the registered information of the block management table.

Then, if the backup program has not ended (S1840: "N"), processing returns to S1815 once again. Furthermore, the processing from S1815 to S1835 is sequentially repeated until the backup program ends, and if data is not updated, the registration of update data is not carried out in S1815. Therefore, if update data is not registered at backup time, processing can return once again to S1630, and can commence from the process for registering update data.

Conversely, when the backup method is not a differential backup (S1810: "N"), that is, since it is a full backup in this case, the backup program 413 determines if it is the backup timing (S1845), and if the backup timing has arrived, sends all the data stored in the storage medium to the backup server 320 (S1850).

Upon receiving a notification to the effect that backup has ended (S1855:"Y"), the control program 401 determines if the backup program 413 has ended (S1865), and when the backup program 413 has not ended (S1865: "N"), returns to S1845 once again.

The preceding explains the programs and processes executed by the computer 100.

Next, the programs and processes executed by the backup server 320, VNC server 330 and delivery server 340 will be explained.

Figure 21A:
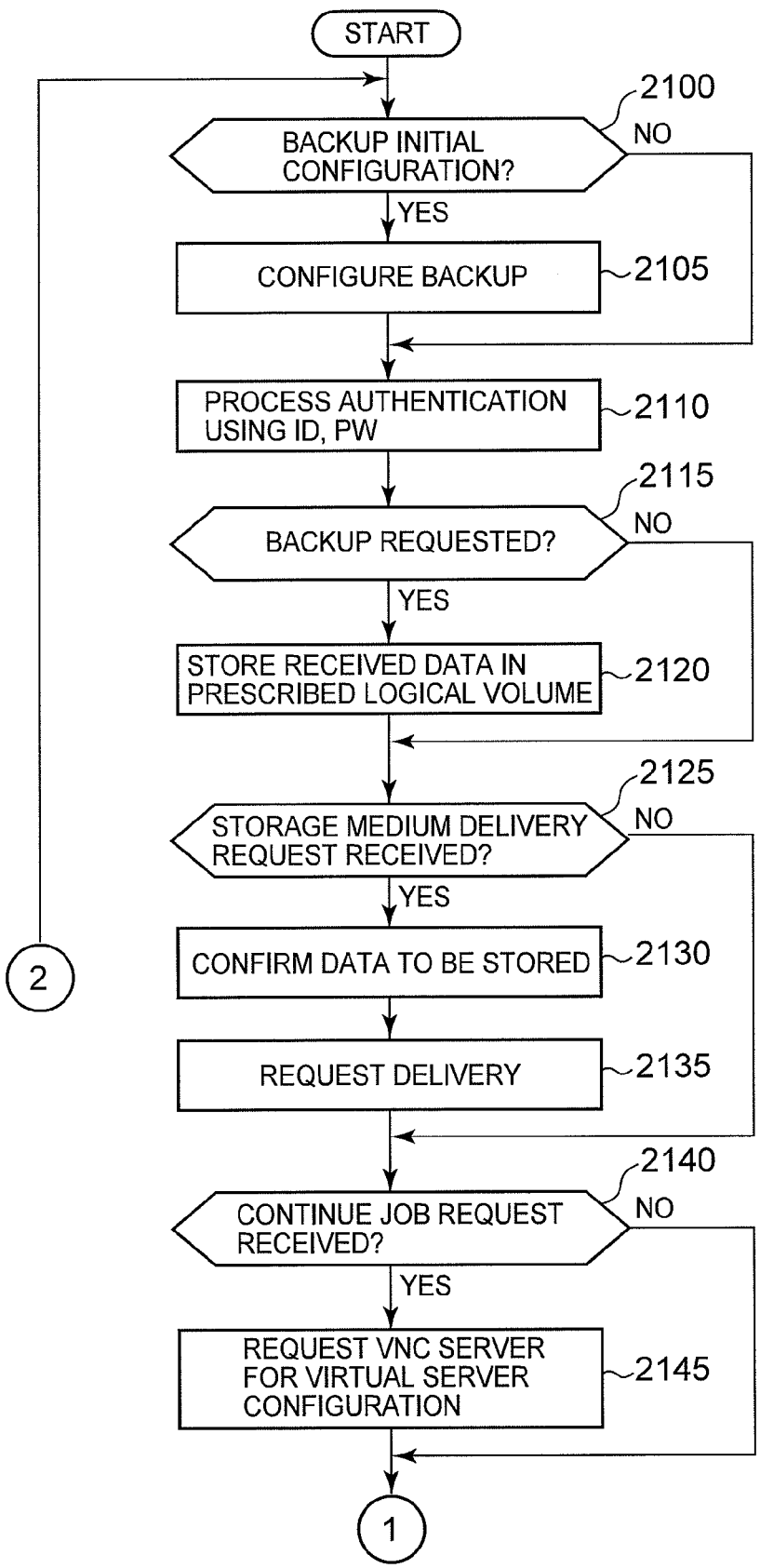
FIG. 21A shows the processing of a backup control program.
Figure 21B:
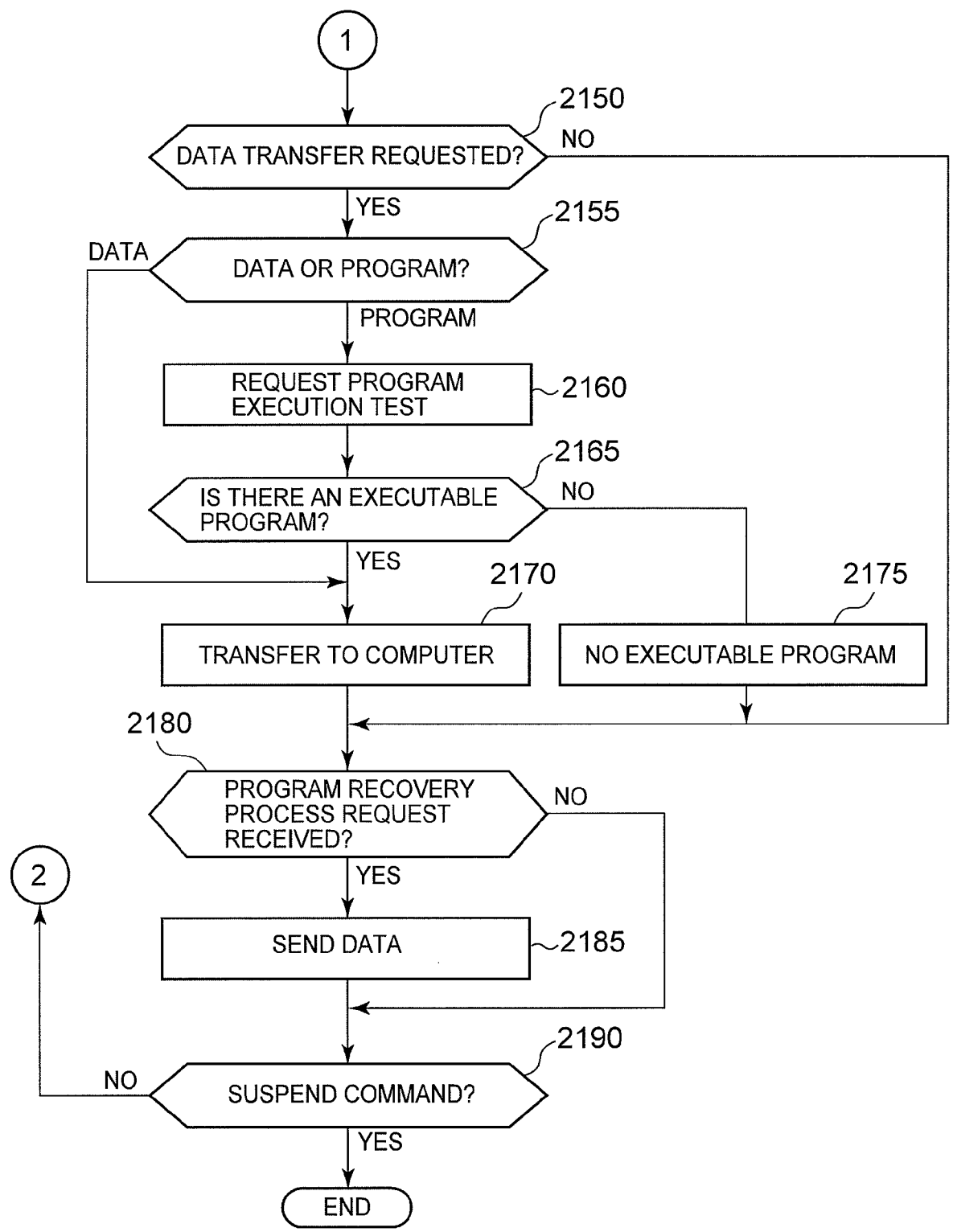
FIG. 21B shows the processing of the backup control program.

FIGS. 21A and B show the processing of the backup control program.

The backup control program 611 is read into the backup server 320, more specifically, the memory of the backup server 320, and is executed by the CPU.

The backup control program 611 executes a backup configuration process, backup process, delivery request process, virtual machine configuration process, data recovery process and backup data recovery process in accordance with a request from the computer 100 until there is a program suspend request.

The backup configuration process configures a storage area or the like for storing data sent from the computer. The backup process stores the data sent from the computer in the configured storage area. The delivery request process requests that the delivery server 340 deliver a storage medium that will serve as a substitute for the failed storage medium. The virtual machine configuration process ramps up a virtual machine for the VNC server 330, and constructs the same environment as that of the computer. The data recovery process sends a program or data requested by the computer. The backup data recovery process is for ensuring the consistency of the data in a substitute storage medium when a substitute storage medium has been configured in the computer.

The backup control program 611, upon receiving a backup initial configuration request (S2100: "Y"), carries out a backup configuration process (S2105). The backup configuration process will be explained further below.

When the backup configuration process is not used (S2100: "N"), the backup control program 611 carries out an authentication process (S2110) using the configured authentication information (ID, PW). Although not shown in the figure, when the sent ID and PW do not match here, that is, when authentication fails, the backup control program 611 issues an authentication-failed notification to the source, and returns to S2100. When the ID and PW match, the authentication process ends and there is a backup request (S2115: "Y"), the backup control program 611 specifies from the user information the logical volume in which the ID and PW match, and stores the sent data in the specified logical volume (S2120). Further, when there is a storage medium delivery request (S2125: "Y"), the backup control program 611 confirms the data stored in the storage medium (S2130). This is a process that prepares the checkpoint explained using FIG. 10, and confirms the data to be stored in the delivered storage medium. First, the backup control program 611 specifies from the user information the logical volume in which the ID and PW match, and copies the data stored in this logical volume to another logical volume. For example, for the storage methods explained using FIGS. 3, 4 and 6, the backup control program 611 issues a copy request to the storage controller 360, and copies the data stored in the Data-Vol, which currently constitutes the write-target, to the Recovery-Vol. Further, the backup control program 611 also configures the time that the copy request was issued in the user information 621 as the checkpoint.

Further, because the data to be sent to the computer from the backup server 320 is deleted in response to the recovery request explained using FIG. 10, a snapshot acquisition request is issued from the backup server 320 to the storage controller 360 in the snapshot storage method explained using FIG. 4. In accordance with this request, the storage controller 360 configures the bitmap to "1". Consequently, when the recovery request is received, the backup server 320 can reduce the amount of data to be sent by reading out from the D-Vol the data that has been changed from "1"→"0" and sending this data.

Further, in the arbitrary time recovery storage method explained using FIG. 6, the backup server 320 can reduce the amount of data to be sent by specifying from the JNL-Vol the data from the time information configured as the checkpoint until the point in time when the recovery request was received.

Next, the backup control program 611 sends the information (Vol-ID) of the new logical volume (Recovery-Vol), which copied the data, the authentication information (ID, PW) and the delivery request to the delivery server 340 (S2135). The processing of the delivery server 340 that received the delivery request will be explained further below.

Further, when there is a continue job request (S2140: "Y"), the backup control program 611 sends a virtual machine configuration request together with the authentication information (ID, PW) to the VNC server 330 (S2145).

Further, when there is a transfer request (S2150: "Y"), the backup control program 611 determines if the target of the transfer request is data or a program (S2155). When the transfer request target is data, this data is read out from the storage device 370 and sent to the request-source computer 100. Conversely, when the target of the transfer request is a program, the backup control program 611 sends a program execution test request to the VNC server 340 together with the user information and request-targeted program name (S2160). The VNC server 330 that receives the request executes the request-targeted program, and notifies the backup server 320 to the effect that the program can be executed normally. If the program cannot be executed normally, the VNC server 330 notifies the backup server 320 that the program cannot be executed. When the program is capable of being executed normally (S2165: "Y"), the backup server 320 sends the program that was able to be executed normally to the request-source computer 100 (S2170). If the program was not able to be executed normally, the backup server 320 notifies the request-source computer 100 that the program is not normal (S2175).

Further, when there is a program recovery process request (S2185: "Y"), the backup control program 611 sends all the data of the logical volume in which the latest data is stored to the request-source computer 100 (S2185). Furthermore, as was explained hereinabove, in the snapshot storage method, the backup control program 611 can send the part of the data that has been updated by the bitmap. Further, in the arbitrary time recovery storage method as well, the backup control program 611 can similarly send the data that has been updated from the time information.

The backup control program 611 determines if a suspend command has been inputted (S2190), and if this command has not been inputted (S2190: "N"), returns to S2100. Conversely, if the suspend command has been inputted (S2190: "Y"), the backup control program 611 ends processing.

Figure 22:
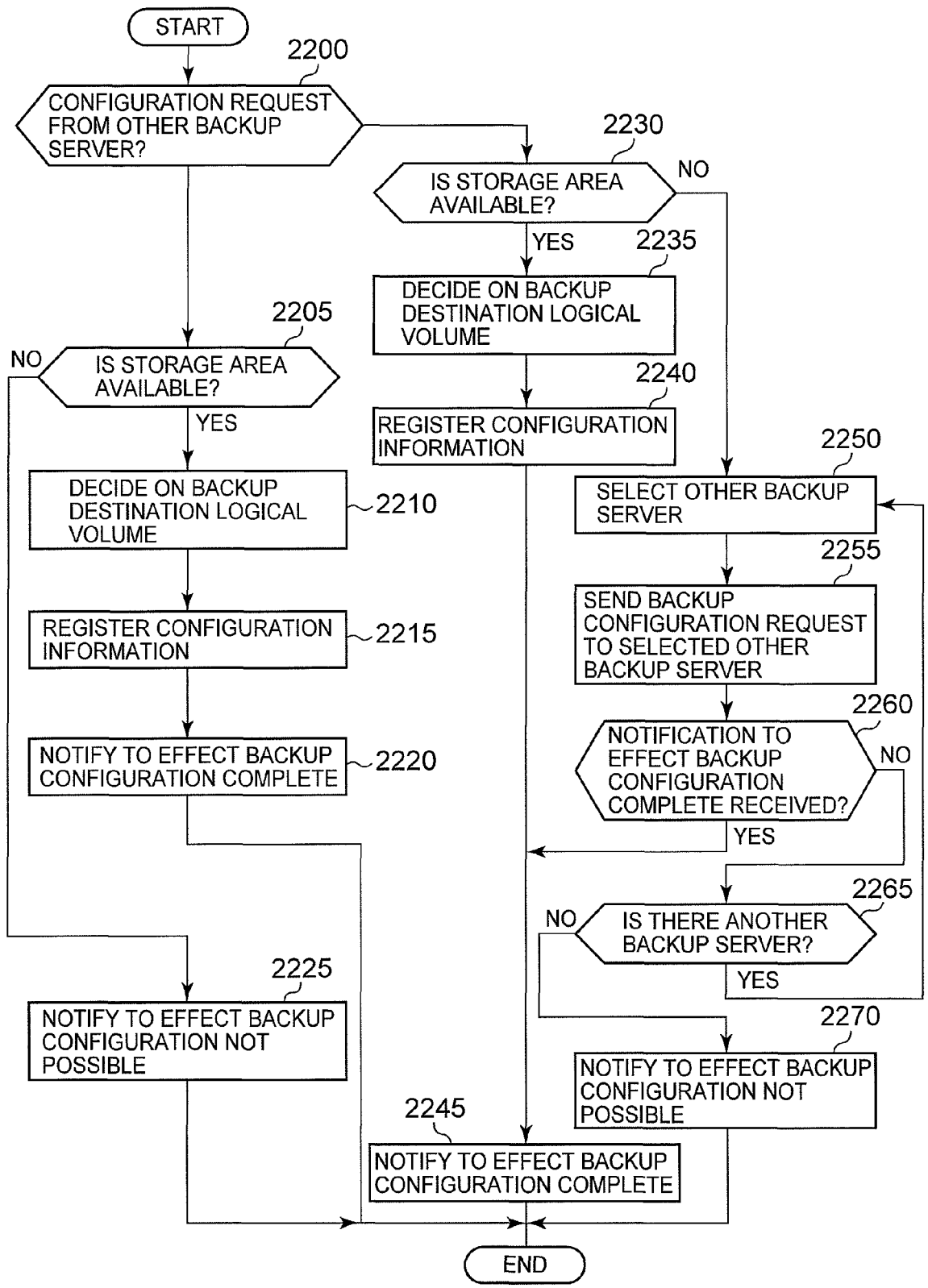
FIG. 22 shows a backup initial configuration process of the backup control program.

FIG. 22 shows the backup initial configuration process of the backup control program. The backup server 320, upon receiving a backup configuration request from the computer 100, determines if it is able to perform the backup on its own, and if it cannot carry out the backup on its own, the backup server 320 transfers the backup configuration request to another backup server. That is, the backup server 320 can receive a backup configuration request from the computer and another backup server. FIG. 22 shows processing that comprises both of these situations.

Upon receiving a backup configuration request, the backup server 320 determines if this request is a request from another backup server or a request from a computer (S2200). FIG. 23 is server information 624 in which the respective servers of data centers, which are connected to a network, are registered. The server information includes type for showing the servers that comprise the data center, the locations of the respective servers, and the server Internet host name. The backup server and VNC server of data center B have the same Internet host name here. That is, a single server is serving as both the backup server and the VNC server.

The backup server 320 that received the configuration request determines on the basis of the Internet host name comprised in the configuration request whether or not the configuration request was received from a backup server registered in this server information, and if the configuration request was sent from a computer or other backup server.

First, in the case of a request from another backup server (S2200: "Y"), the backup server 320 determines if it is possible to reserve a storage area (S2205).

FIG. 24 shows logical volume information. A logical volume ID (Vol-ID), a serial number (Serial No.) for specifying the HDD 371 configuring the logical volume, the addresses of the respective HDD 371, capacity and purpose are registered in the logical volume information. For example, in the case of logical volume having Vol-ID "0", a storage area with a capacity of 40 G is formed using HDD 00 through 04 with the addresses of the respective HDD being from 0000 through 0100, and this logical volume information shows that the backup control program is stored therein. A logical volume for which a purpose is not configured (for example, Vol-ID "6", "11" and "12") is an unused logical volume.

Based on this logical volume information, the backup control program 611 determines if there is an unused logical volume, and if this unused logical volume has a capacity greater than that comprised in the configuration request. When there is an unused logical volume, and this logical volume has a capacity greater than that comprised in the configuration request (S2205: "Y"), the backup control program 611 decides on this logical volume as the backup-destination logical volume (S2210), and registers the configuration information (S2215). The configuration information is registered in the logical volume information 623 and in the user information 621. The backup control program 611 registers "user data" in the purpose field corresponding to the determined Vol-ID in the logical volume information 623.

FIG. 28 shows an example of user information. A user ID, password, location, Data-Vol identifier, type of storage, checkpoint, and RVol, DVol, BVol, JVol and GVOL identifiers are registered in the user information 621. The Data-Vol is the identifier of the backup-destination logical volume. The type of storage is the storage methods explained using FIGS. 3, 4 and 6. The RVol is the logical volume used as the Recovery-Vol explained using FIGS. 3, 4 and 6. Similarly, the DVol is the logical volume used as the D-Vol, the B-Vol is the logical volume used as the Case-Vol, and the JVol is the logical volume used as the JNL-Vol. The GVol is the logical volume used as Data-Vol (a) through Data-Vol (c) shown in FIG. 3. The registration in the user information 621 of S2215 here involves registering the user ID, password, location, and Data-Vol.

When the registration of the configuration information ends, the backup server 320 notifies the backup server, which is the source of the configuration request, to the effect that the backup configuration is complete, and of its own backup server Internet host name (S2220), and ends processing.

Conversely, when there is no storage area (S2205: "N"), the backup server 320 notifies the backup server, which is the source of the configuration request, to the effect that a backup configuration cannot be performed (S2225), and ends processing.

When the configuration request is a request from the computer (S2200: "N"), the backup control program 611 determines if there is a storage area (S2230). When there is a storage area (S2230: "Y"), the backup control program 611 decides on the backup-destination logical volume (S2235), and registers the configuration information (S2240). The processing from this S2230 through S2240 is the same processing as S2205 through S2215. When the registration of the configuration information ends, the backup server 320 notifies the computer 100, which is the source of the configuration request, to the effect that the backup configuration is complete (S2245), and ends processing.

Conversely, when it is determined that there is no storage area (S2230: "N"), the backup control program 611 selects another backup server from the server information shown in FIG. 23 (S2250). Next, the backup control server 611 sends the backup configuration request to the selected backup server (S2255). In this case, the authentication information and backup configuration information sent from the computer are also sent. Upon receiving a notification from the other backup server to the effect that the backup configuration is complete (S2260: "Y"), the backup server 320 sends to the configuration request-source computer a notification to the effect that the backup configuration has been completed, as well as the Internet host name of the backup server for which the backup configuration has been completed (S2245), and ends processing.

Conversely, upon receiving a notification to the effect that the backup configuration cannot be carried out (S2260: "N"), the backup server 320 determines from the server management table if there is another backup server (S2265), and if there is another backup server, returns to S2250, and continues processing. Conversely, if there is no other backup server (S2265: "IN"), the backup server 320 sends a notification to the configuration request-source computer to the effect that a backup configuration cannot be carried out (S2270), and ends processing.

The initial configuration for a backup is carried out between the computer and the backup server as described hereinabove.

Figure 25:
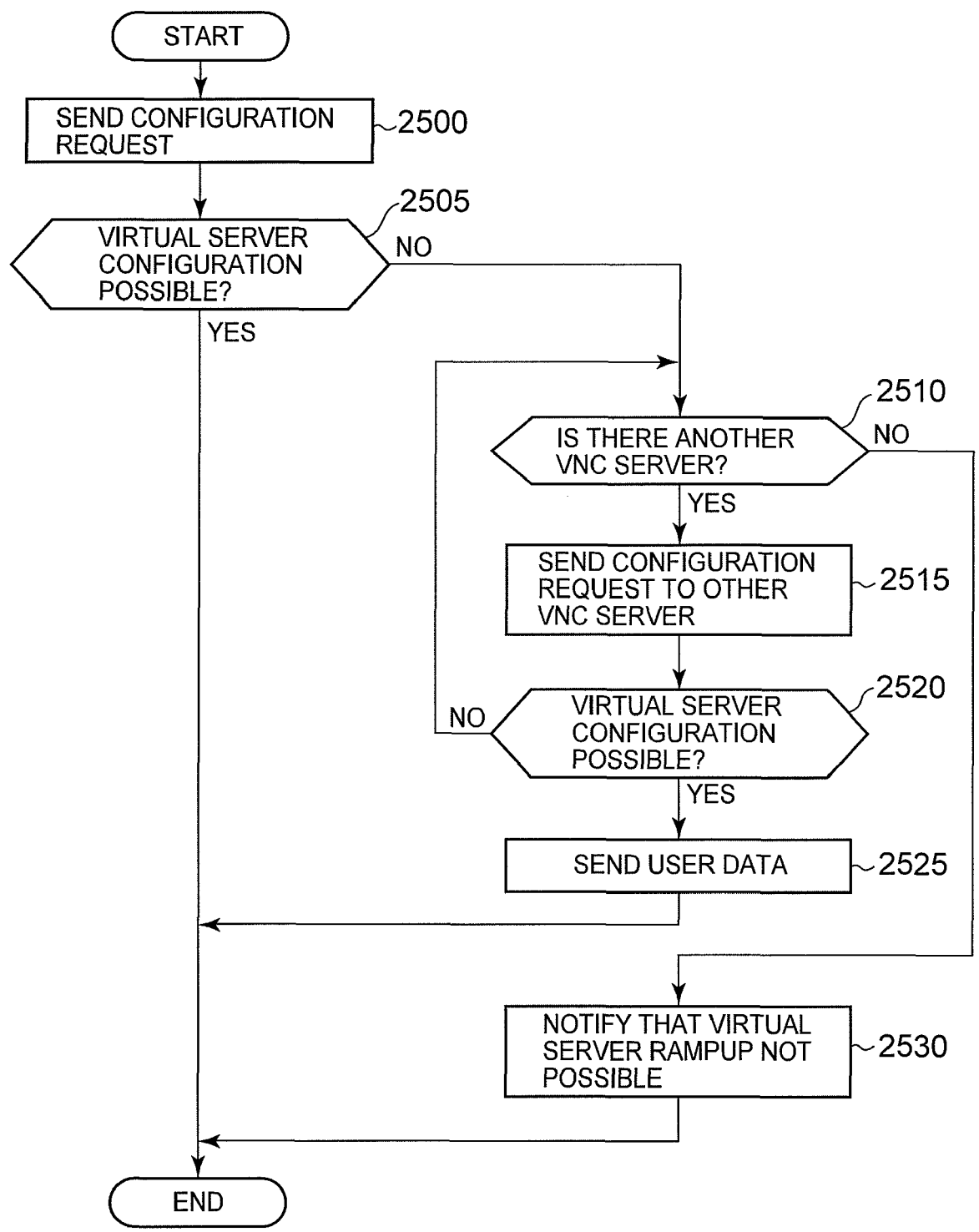
FIG. 25 shows a virtual computer configuration process of the backup control program.

FIG. 25 shows a virtual machine configuration process of the backup control program.

Upon receiving a virtual machine configuration request, the backup control program 611 sends a virtual machine configuration request to the VNC server 330 (S2500). Upon receiving a notification from the VNC server 330 to the effect that virtual machine configuration is possible (S2505: "Y"), the backup control program 611 ends processing. Conversely, when a notification that a virtual machine configuration is possible is not received from the VNC server 330 (S2505: "N"), the backup control program 611 determines from the server management table if there is a VNC server at another data center (S2510), and if there is another VNC server, sends the virtual machine configuration request to this other VNC server (S2515).

Upon receiving a notification from the VNC server at the other data center to the effect that virtual machine configuration is possible (S2520: "Y"), the backup control program 611 sends the user data to the VNC server that sent the notification that virtual machine configuration is possible (S2525), and ends processing. When a notification that virtual machine configuration is not possible is received (S2520: "N"), the backup control program 611 determines if there is a VNC server at another data center (S2510), and if there is no other VNC server, notifies the computer 100 to the effect that a virtual machine cannot be configured (S2530), and ends processing. When there is a VNC server at the other data center, the backup control program 611 moves to S2515 and carries out processing.

Figure 26:
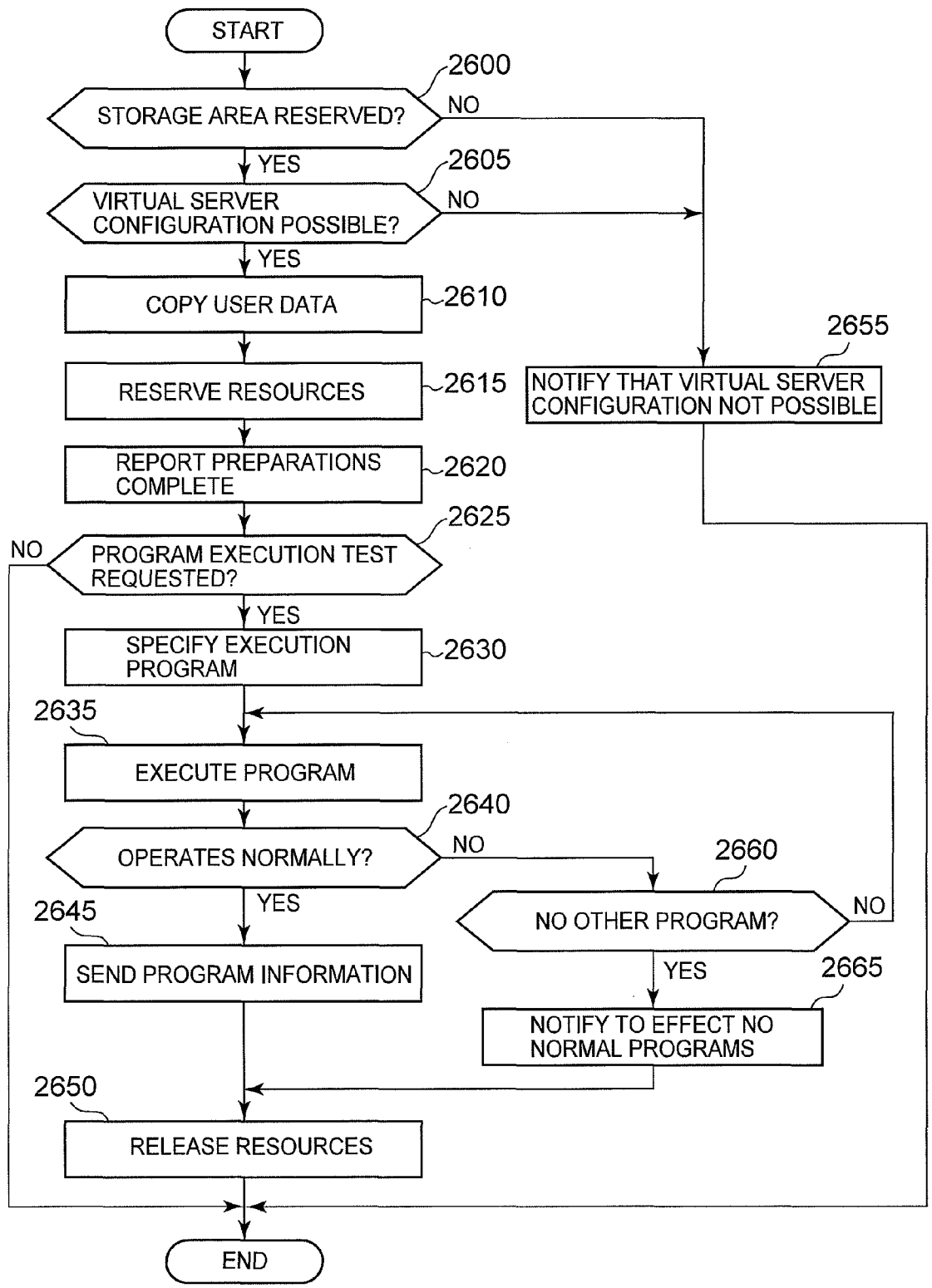
FIG. 26 shows a virtual computer configuration process of a VNC server.

FIG. 26 shows the virtual machine configuration process of the VNC server.

The VNC server 330, upon receiving either a virtual machine configuration request or a program execution test request from the backup server 320, determines if there is a prescribed storage area that can be used by the virtual machine (S2600). This determines, on the basis of the logical volume information 623, if there is an unused logical volume, and if this unused logical volume has capacity greater than that of the backup target of the request-source computer.

Figure 30:
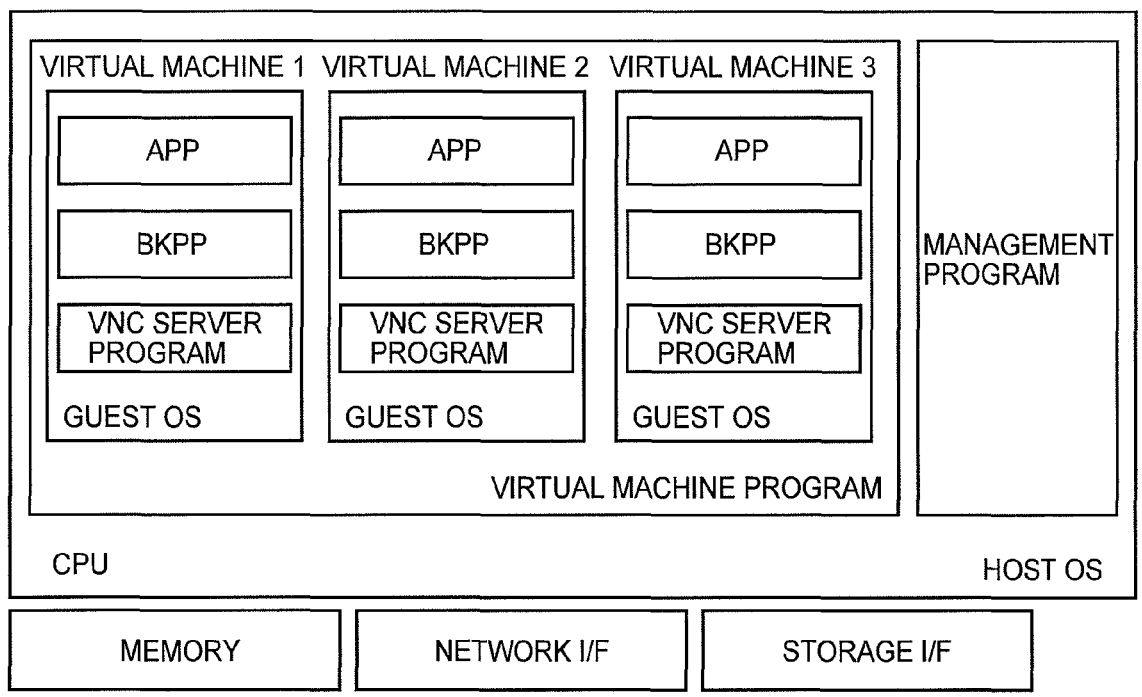
FIG. 30 shows an overview of a program executed on the server.

When a prescribed logical volume exists (S2600: "Y"), the VNC server 330 determines if a virtual machine can be configured (S2605). The VNC server 330, as shown in FIG. 30, is a configuration in which hardware resources such as the CPU and memory are logically split and used. Then, control is exerted such that an operating system and application program can be executed on the logically split hardware resources. FIG. 31 shows a service status management table for managing the load on the VNC server CPU in terms of which user is executing which programs. The virtual machine configuration program determines on the basis of this server status management table if a new virtual machine is configurable. More specifically, the virtual machine configuration program either configures the number of virtual machines capable of being configured beforehand, or configures the utilization ratio of the CPU capable of being used with one virtual machine beforehand, and when the number of virtual machines exceeds the configurable number, or when the CPU utilization ratio exceeds the prescribed threshold, determines that a new virtual machine cannot be configured. In other words, when the number of virtual machines does not exceed the pre-configured configurable number, or when the CPU utilization ratio does not exceed the prescribed threshold, the virtual machine configuration program determines that a new virtual machine can be configured.

When a virtual machine is capable of being configured (S2605: "Y"), the virtual machine configuration program copies the user data to the logical volume specified in S2600 (S2610). For example, when Vol-ID "10" is specified as the prescribed logical volume and the ID is comprised in the virtual machine configuration request, the data backup destination of this ID is Vol-ID "1". The backup control program 611 issues an indication to the storage controller 360 to copy the data stored in Vol-ID "1" to the logical volume of Vol-ID "10". The storage controller 360, which receives this indication, uses the copy control program stored in the main memory 363 to carry out a copy from Vol-ID "1" to Vol-ID "10". Furthermore, when there is a plurality of generations of logical volumes as the backup destination, the copy is carried out from the logical volume in which the latest data is stored. Or, a copy-source logical volume can be specified based on the generational information in the virtual machine configuration request. Using the storage controller 360 to carry out a copy like this makes it possible to execute the data copy at high speed, without placing a burden on the backup server.

Next, the backup server 320 reserves the CPU and memory hardware resources of the VNC server (S2615), and sends a message to the request-source computer 100 that VNC preparation is complete (S2620).

When the request from the backup server 320 here is a program execution test request (S2625: "Y"), the VNC server 330 specifies on the basis of the control information the logical volume in which the latest generation is stored (S2630), and reads out and executes the program that constitutes the target of the test request from the specified logical volume (S2635). When the program can be executed normally (S2640: "Y"), the VNC server 330 sends the Vol-ID to the backup server 320 (S2645). When the program cannot be executed normally, the VNC server 330 determines on the basis of the control information if there is a logical volume in which the previous generation is stored (S2660). When the backup method here is the generational backup, the VNC server 330 determines if the previous generation logical volume exists. In the case of the snapshot backup method, the VNC server 330 determines if a snapshot of the previous point in time exists. If data recovery is at an arbitrary time, for example, the VNC server 330 determines if data of a past point in time can be recovered in prescribed intervals of one hour prior, or one day prior. This determination is made if there is JNL data up to one hour prior or one day prior.

When there is a logical volume in which the subsequent generation is stored, the VNC server 330 carries out the processing of S2630. Conversely, when there is no next generation logical volume, the VNC server 330 notifies the backup server 320 that there is no program capable of being executed (S2665). Thereafter, the VNC server 330 releases the resources (S2650), and ends processing. Conversely, when a storage area cannot be reserved (S2600: "N"), and it is impossible to configure a virtual machine (S2605: "N"), the VNC server 330 notifies the backup server 320 to the effect that a virtual machine cannot be configured (S2655), and ends processing.

Figure 27:
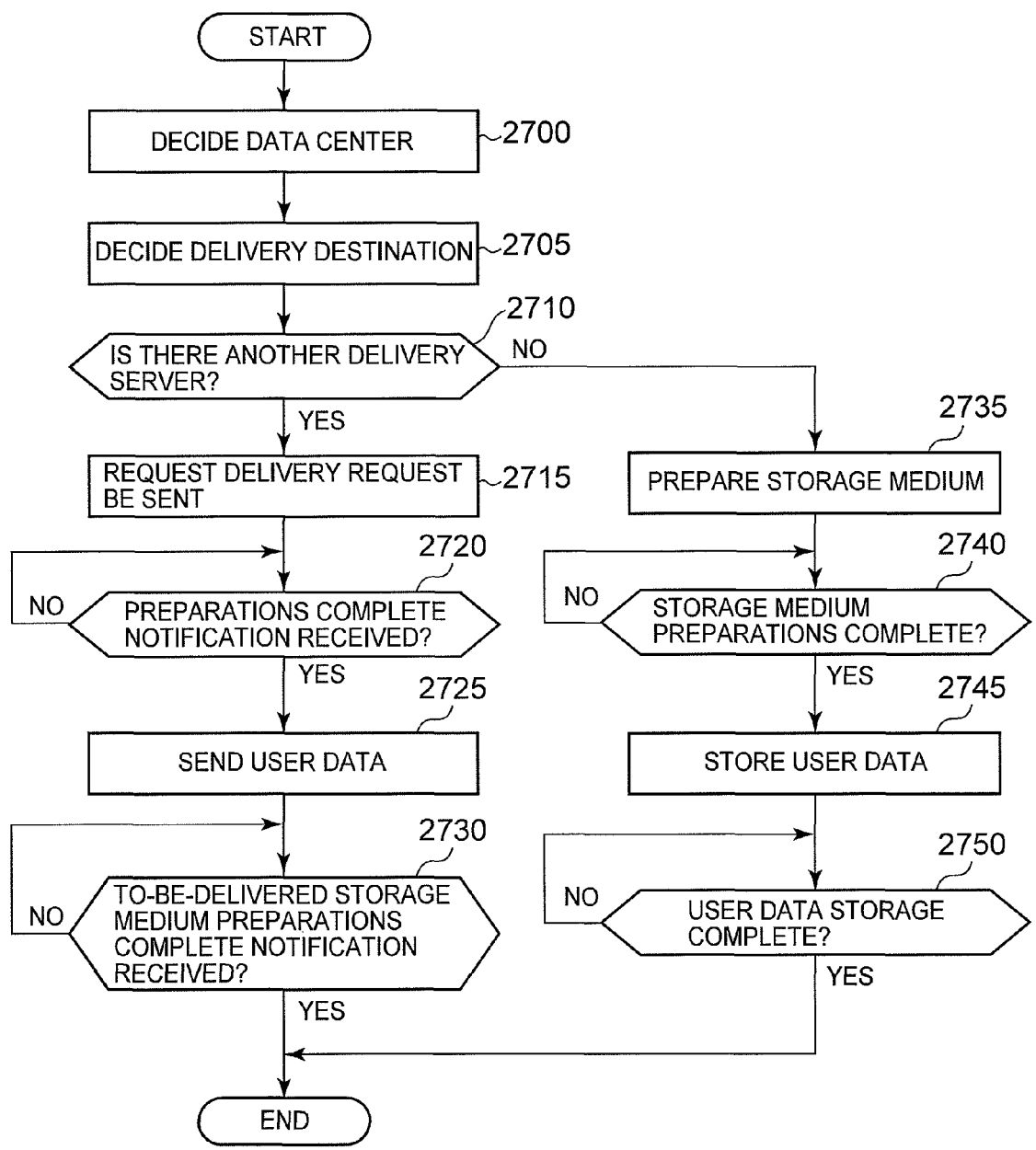
FIG. 27 shows the processing of a delivery processing program.

FIG. 27 shows the processing of the delivery processing program.

The delivery processing program is executed by the delivery server 340.

The delivery server 340, which receives a delivery request, finds the nearest data center on the basis of the delivery information 625 and server information 624 (S2700).

FIG. 32 shows an example of delivery information. Delivery information is configured for each user, and in the delivery information are registered delivery candidates, nearest data centers, and delivery times. The delivery information location, which is comprised in the authentication information sent from the computer 100, is registered in the backup configuration. Further, the user can also register a separate location via the computer 100. Then, the delivery server 340 specifies from the server information 624 the delivery servers nearest to the location of the delivery candidates, and registers the specified delivery servers in the nearest data centers. The delivery server 340 uses map information and the like to find the distances from the delivery server locations to the delivery candidate locations, and establishes the delivery candidate that is the shortest distance away as the nearest delivery server. Further, the delivery server 340 determines the delivery times from the time it takes to copy the data to the storage medium and the time it takes to send the storage medium to the delivery destinations based on the distance to the delivery candidates, and registers these delivery times. When the nearest data centers and delivery times have been determined for the delivery candidates, next the delivery server 340 queries the delivery request-source computer as to the delivery destination (S2705).

Figure 33:
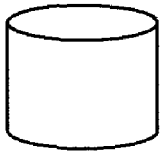
FIG. 33 shows an example of a delivery request screen.

This information is displayed on the screen of the request-source computer shown in FIG. 33. The information displayed on the screen is the delivery candidates and the delivery times, which constitute the delivery information. The user can select a delivery candidate from this screen, or input a new delivery destination.

When the delivery candidate has been decided, the delivery server 340 determines if the nearest delivery server is its own server (S2710). Furthermore, when a new location has been inputted, the delivery server 340 registers a new location as a delivery candidate, and registers the nearest delivery server and the delivery time.

When the nearest delivery server is another delivery server (S2710: "Y"), the delivery server 340 sends a delivery request together with the specifications of the storage medium to this other delivery server (other delivery server) (S2715). Upon receiving a notification from the other delivery server to the effect that preparations for the storage medium are complete (S2720: "Y"), the delivery server 340 sends the user data to the other delivery server (S2725), and upon receiving a notification to the effect that preparations for the storage medium to be delivered are complete (S2730: "Y"), ends processing.

Conversely, when the nearest delivery server is its own server (S2700: "IN"), the delivery server 340 specifies the substitute storage medium from the storage medium specifications (S2735).

FIG. 34 shows compatible storage medium information for deciding on a substitute storage medium. The compatible storage medium information shows the corresponding relationship between the pre-replacement HDD and the replacement HDD. The delivery server 340 specifies a replacement HDD based on the specifications of the storage medium comprised in the delivery request. The delivery server 340 receives a notification to the effect that a storage medium has been prepared for the HDD write device 350 (S2740: "Y"), reads out the user data from the specified logical volume, and transfers the user data to the HDD write device 350 (S2745). When user data storage is complete (S2750: "Y"), the delivery server 340 ends processing.

Furthermore, the delivery server decision was determined by the delivery address, but the delivery server 340 can also decide on the delivery server that is near the service provider (access) point of the computer 100 that made the delivery request.

The preceding has explained the processing of the backup server, VNC server, and delivery server. As has already been explained, this processing is carried out by executing programs, and the programs explained herein can be executed by a single server.

What is claimed is:

1. An information processing system, in which a computer having a first storage device and a storage controller having a second storage device are connected via a network, wherein
   the computer manages an update status of the first storage device, and when able to communicate with the storage controller, and transfers the data written to the first storage device to the storage controller, independently of data writing to the first storage device,
   the storage controller writes the transferred data to the second storage device,
   the computer, upon detecting a failure of the first storage device, notifies the storage controller of the failure, and
   the storage controller, which receives the failure information notification, selects a third storage device that is capable of being used by the computer, and copies the data, which have been written to the second storage device, to the selected the third storage device,
   wherein the computer transfers an operating system and application program written to the first storage device to the storage controller,
   wherein the storage controller, upon receiving a failure information notification from the computer, activates the operating system stored in the second storage device, and sends operating system activated screen information to the computer, and
   wherein the computer suspends the operating system that has been activated, and displays the received screen information on a display device of the computer.

2. The information processing system according to claim 1, wherein the computer sends input information inputted from an input device to the storage controller, the storage controller executes processing in accordance with the received input information and sends screen information on execution results to the computer, and the computer displays the sent screen information on the display device of the computer.

3. The information processing system according to claim 1, wherein the storage controller manages a difference between data written to the second storage device and data written to the third storage device.

4. The information processing system according to claim 1, wherein the computer, upon the third storage device being installed in the storage device of a computer thereof, notifies the storage controller of a transfer of difference data between the second storage device and the third storage device.

5. The information processing system according to claim 1, wherein the computer, upon detecting the failure of either the operating system or application program stored in the first storage device, requests the storage controller to transfer the failed operating system or application program.

6. A data recovery method for recovering data stored in a storage area of a computer, comprising the steps of:
　managing by the computer an update status of a first storage device of the computer, and, when the computer is able to communicate with a storage controller, transferring the data written to the first storage device to the storage controller, independently of data writing to the first storage device, and
　writing by the storage controller the transferred data to a second storage device;
　notifying, upon detecting a failure of the first storage device, the storage controller of failure information by the computer;
　selecting, by the storage controller that has received the failure information notification, a third storage device that is capable of being used by the computer, and copying the data, which have been written to the second storage device, to the selected the third storage device;
　sending, by the computer, input information inputted from an input device to the storage controller;
　executing, by the storage controller, processing in accordance with the received input information and sending screen information of execution results to the computer; and
　displaying, by the computer, the sent screen information on a display device of the computer.

7. The data recovery method according to claim 6, further comprising a step of:
　transferring by the computer an operating system and application program written to the first storage device to the storage controller.

8. A data recovery method for recovering data stored in a storage area of a computer, comprising the steps of:
　managing by the computer an update status of a first storage device of the computer, and, when the computer is able to communicate with a storage controller, transferring the data written to the first storage device to the storage controller, independently of data writing to the first storage device, and
　writing by the storage controller the transferred data to a second storage device;
　notifying, upon detecting a failure of the first storage device, the storage controller of failure information by the computer;
　selecting, by the storage controller that has received the failure information notification, a third storage device that is capable of being used by the computer, and copying the data, which have been written to the second storage device, to the selected the third storage device,
　activating by the storage controller, upon receiving a failure information notification from the computer, the operating system stored in the second storage device, and sending operating system activated screen information to the computer; and
　suspending, by the computer, the activated operating system, and displaying the received screen information on a display device of the computer.

9. The data recovery method according to claim 6, further comprising a step of:
　managing, by the storage controller, a difference between data written to the second storage device and data written to the third storage device.

10. The data recovery method according to claim 6, further comprising a step of:
　notifying by the computer, upon the third storage device being installed in the storage device of a computer thereof, the storage controller of transfer of difference data between the second storage device and the third storage device.

11. The data recovery method according to claim 6, further comprising a step of:
　requesting by the computer, upon detecting a failure of either the operating system or application program stored in the first storage device, the storage controller to transfer the failed operating system or application program.

* * * * *